United States Patent
Martin et al.

(10) Patent No.: US 9,832,020 B2
(45) Date of Patent: *Nov. 28, 2017

(54) CRYPTOGRAPHIC PROTOCOL FOR PORTABLE DEVICES

(71) Applicant: Nymi Inc., Toronto (CA)

(72) Inventors: Karl Martin, Toronto (CA); Evgene Vahlis, Toronto (CA)

(73) Assignee: Nymi Inc., Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/225,600

(22) Filed: Aug. 1, 2016

(65) Prior Publication Data

US 2017/0180130 A1 Jun. 22, 2017

Related U.S. Application Data

(63) Continuation of application No. 14/949,509, filed on Nov. 23, 215, now Pat. No. 9,407,634, which is a
(Continued)

(51) Int. Cl.
*H04L 29/06* (2006.01)
*H04L 9/32* (2006.01)
(Continued)

(52) U.S. Cl.
CPC .............. *H04L 9/3231* (2013.01); *H04L 9/12* (2013.01); *H04L 9/14* (2013.01); *H04L 9/30* (2013.01);
(Continued)

(58) Field of Classification Search
USPC ......................................................... 726/10
See application file for complete search history.

(56) References Cited

U.S. PATENT DOCUMENTS

| 5,490,139 A | 2/1996 | Baker et al. |
| 6,041,410 A | 3/2000 | Hsu et al. |

(Continued)

FOREIGN PATENT DOCUMENTS

| WO | 2004012388 A1 | 2/2004 |
| WO | 2005117527 A3 | 4/2006 |

(Continued)

OTHER PUBLICATIONS

International Search Report and Written Opinion for International Application No. PCT/IB2014/001383 dated Dec. 8, 2014, 11 pages.
(Continued)

*Primary Examiner* — Jason Lee
(74) *Attorney, Agent, or Firm* — John W. Branch; Lowe Graham Jones PLLC

(57) ABSTRACT

Embodiments are directed towards communicating using a mobile device that performs actions including. A mobile device may be provisioned with an access point such that a provisioning key and a provisioning token for each of the provisioned access points may be stored on the mobile device. The mobile device may be determined to be in the presence of a provisioned access point based on the provisioning key and an advertising nonce. The advertising nonce may be encrypted with the provisioning key. A communication channel between the mobile device and the access point may be established based on a session nonce, the advertising nonce, and the provisioning key. A session key may be generated based in part on the advertising nonce and a message counter. And, encrypted message packets that include a message and a message authentication tag may be communicated to the access point.

20 Claims, 18 Drawing Sheets

Related U.S. Application Data continuation of application No. 14/675,489, filed on Mar. 31, 2015, now Pat. No. 9,197,414, which is a continuation-in-part of application No. 14/461,881, filed on Aug. 18, 2014, now Pat. No. 9,032,501.

(51) Int. Cl.

| | |
|---|---|
| *H04W 12/06* | (2009.01) |
| *H04L 9/14* | (2006.01) |
| *H04L 9/30* | (2006.01) |
| *H04L 9/12* | (2006.01) |
| *H04W 12/04* | (2009.01) |
| *G06Q 30/02* | (2012.01) |

(52) U.S. Cl.
CPC ........ *H04L 63/0428* (2013.01); *H04L 63/061* (2013.01); *H04L 63/0853* (2013.01); *H04L 63/0861* (2013.01); *H04W 12/04* (2013.01); *H04W 12/06* (2013.01); *G06Q 30/0277* (2013.01); *H04L 2209/80* (2013.01)

(56) References Cited

U.S. PATENT DOCUMENTS

| | | | |
|---|---|---|---|
| 6,418,424 | B1 | 7/2002 | Hoffberg et al. |
| 6,580,356 | B1 | 6/2003 | Alt et al. |
| 6,799,729 | B1 | 10/2004 | Voic |
| 7,023,320 | B2 | 4/2006 | Dvorak |
| 7,095,707 | B2 | 8/2006 | Rakib et al. |
| 7,378,939 | B2 | 5/2008 | Sengupta et al. |
| 7,689,833 | B2 | 3/2010 | Lange |
| 7,780,080 | B2 | 8/2010 | Owen et al. |
| 7,814,332 | B2 | 10/2010 | Beenau et al. |
| 8,352,730 | B2 | 1/2013 | Giobbi |
| 8,371,501 | B1 | 2/2013 | Hopkins |
| 8,412,949 | B2 * | 4/2013 | Giobbi ............... G07C 9/00087 713/169 |
| 8,468,362 | B2 | 6/2013 | Konetski et al. |
| 8,869,263 | B2 | 10/2014 | Pasquero et al. |
| 8,994,498 | B2 | 3/2015 | Agrafioti et al. |
| 9,189,901 | B2 | 11/2015 | Agrafioti et al. |
| 9,349,235 | B2 | 5/2016 | Agrafioti et al. |
| 2002/0140542 | A1 | 10/2002 | Prokoski et al. |
| 2003/0046228 | A1 | 3/2003 | Berney |
| 2003/0135097 | A1 | 7/2003 | Wiederhold et al. |
| 2005/0068171 | A1 | 3/2005 | Kelliher et al. |
| 2006/0090909 | A1 | 5/2006 | Carter |
| 2007/0016088 | A1 | 1/2007 | Grant et al. |
| 2007/0049267 | A1 | 3/2007 | Kota et al. |
| 2007/0063548 | A1 | 3/2007 | Eipper |
| 2007/0177770 | A1 | 8/2007 | Derchak et al. |
| 2007/0186105 | A1 * | 8/2007 | Bailey ................. H04L 63/0492 713/168 |
| 2008/0091681 | A1 | 4/2008 | Dwivedi et al. |
| 2008/0216171 | A1 | 9/2008 | Sano et al. |
| 2008/0253626 | A1 | 10/2008 | Shuckers et al. |
| 2008/0294907 | A1 | 11/2008 | Hively |
| 2009/0037983 | A1 | 2/2009 | Chiruvolu et al. |
| 2009/0146947 | A1 | 6/2009 | Ng |
| 2009/0199264 | A1 | 8/2009 | Lang |
| 2010/0030695 | A1 | 2/2010 | Chen et al. |
| 2010/0306106 | A1 | 12/2010 | Dagan |
| 2010/0311482 | A1 | 12/2010 | Lange |
| 2010/0325218 | A1 | 12/2010 | Castro et al. |
| 2012/0004523 | A1 | 1/2012 | Richter et al. |
| 2012/0060030 | A1 | 3/2012 | Lamb |
| 2012/0123232 | A1 | 5/2012 | Najarian et al. |
| 2012/0198277 | A1 | 8/2012 | Busser et al. |
| 2012/0316406 | A1 | 12/2012 | Rahman et al. |
| 2012/0317024 | A1 | 12/2012 | Rahman et al. |
| 2013/0159021 | A1 * | 6/2013 | Felsher ................. G06F 19/322 705/3 |
| 2013/0322622 | A1 | 12/2013 | Bailey et al. |
| 2014/0188770 | A1 | 7/2014 | Agrafioti et al. |
| 2015/0028996 | A1 | 1/2015 | Agrafioti et al. |

FOREIGN PATENT DOCUMENTS

| | | |
|---|---|---|
| WO | 2007123975 A2 | 11/2007 |
| WO | 2012151680 A1 | 11/2012 |

OTHER PUBLICATIONS

Official Communication for U.S. Appl. No. 14/461,881 dated Oct. 27, 2014 (18 pages).

Agrafioti et al., "Medical Biometrics in Moble Health Monitoring," Security and Communication Networks, 2011, 4, pp. 525-539.

Hoekerna et al., "Geometrical Aspects of the Interindividual Variability of Multilead ECG Recordings," IEEE Transactions on Biometrical Engineering, vol. 48, No. 5, May 2001, pp. 551-559.

Draper et al., "The Corrected Orthogonal Electrocardiogram and Vectorcardiogram in 510 Normal Men (Frank Lead System)" Circulation, vol. 30, 1964, pp. 853-864.

Biel et al., "ECG Analysis: A New Approach in Human Identification," IEEE Transactions on Instrumentation and Measurement, vol. 50, No. 3, Jun. 2001, pp. 808-812.

Wubbeler et al., "Verification of Humans Using the Electrocardiogram," Pattern Recognition Letter, vol. 28, No. 10, 2007, pp. 1172-1175.

Odinaka et al., "ECG Biometrics: A Robust Short-time Frequency Analysis," Proceedings of IEEE International Workshop on Information Forensics and Security, Dec. 2010, pp. 1-6.

Li et al., "Robust ECG Biometrics by Fusing Temporal and Cepstral Information," Proceedings of 20th International Conference on Pattern Recognition, Aug. 2010, pp. 1326-1329.

Agrafioti et al., "ECG Based Recognition Using Second Order Statistics," Communication Networks and Services Research Conference, May 2008, pp. 82-87.

Agafioti et al., "Heart Biometrics: Theory, Methods, and Applications," Intech, www.intechopen.com, 19 pages.

Agrafioti et al., "Signal Validation for Cardiac Biometrics," IEEE 35th International Conference on Acoustics, Speech, and Signal Processing, 2010, pp. 1734-1737.

Zhao et al., "Fingerprint Image Synthesis Based on Statistical Feature Models," IEEE 5th International Conference on Biometrics: Theory, Applications, and Systems, 2012, pp. 23-30.

Agrafioti et al., "Medical Biometrics: The Perils of Ignoring Time Dependency," Proceedings of 3rd International Conference on Biometrics: Theory, Applications, and Systems, 2009, pp. 1-6.

Odinaka et al., "ECG Biometric Recognition: A Comparative Analysis" IEEE Transactions on Information Forensics and Security, vol. 7, No. 6, Dec. 2012, pp. 1812-1824.

Bellare et al., "Forward-Security in Private-Key Cryptography," Department of Computer Science and Engineering, 2003, pp. 1-24.

International Search Report for Application No. PCT/CA2012/000448 dated Aug. 23, 2012 (4 pages).

Wang et al., "Analysis of Human Electrocardiogram for Biometric Recognition", EURASIP Journal on Advances in Signal Processing, vol. 2008, Article 10 148658, pp. 1-11, Jan. 31, 2008.

Klosterman et al. "Secure Continuous Biometric-Enhanced Authentication", CMU-CS-00-134, School of Computer Science, Carnegie Mellon University, pp. 1-22, May 31, 2000.

Ortega-Garcia, et al., "MCYT Baseline Corpus: A Bimodal Biometric Database", IEE Proc.-Vis. Image Signal Process, vol. 150, No. 6, pp. 395-401. Dec. 31, 2003.

Pasini et al., "Sas-based Authenticated Key Agreement," In Public Key Cryptography—PKC 2006, pp. 395-409, Springer, 2006.

Official Communication for U.S. Appl. No. 14/670,316 dated May 8, 2015 (20 pages).

Noble et al.. "The Case for Transient Authentication," Department of Electrical Engineering and Computer Science, University of Michigan, Ann Arbor, MI, 6 pages.

Ojala et al., "Wearable Authentication Device for Transparent Login in Nomadic Applications Environment," 2008 International Conference on Signals, Circuits and Systems, 6 pages.

Al-Muhtadi et al., "Wearable Security Services," Department of Computer Science, 6 pages.

(56) References Cited

OTHER PUBLICATIONS

Official Communication for U.S. Appl. No. 14/340,414 dated Jan. 22, 2015 (15 pages).
Supplementary European Search report and Search Opinion for EP application 12782151.0 dated Mar. 12, 2015 (7 pages).
Official Communication for U.S. Appl. No. 14/461,831 dated Feb. 12, 2015 (28 pages).
Official Communication for U.S. Appl. No. 14/675,489 dated Jun. 11, 2015 (24 pages).
Official Communication for U.S. Appl. No. 14/675,489 dated Sep. 23, 2015 (11 pages).
Official Communication for U.S. Appl. No. 14/670,316 dated Aug. 31, 2015 (9 pages).
Official Communication for U.S. Appl. No. 14/942,919 dated Mar. 30, 2016 (14 pages).
Official Communication for U.S. Appl. No. 14/116,058 dated Mar. 25, 2016 (19 pages).
Official Communication for U.S. Appl. No. 14/116,058 dated Jul. 12, 2016 (16 pages).
Official Communication for U.S. Appl. No. 15/162,109 dated Aug. 10, 2016 (14 pages).
Official Communication for U.S. Appl. No. 14/949,509 dated Jun. 7, 2016 (11 pages).
Official Communication for U.S. Appl. No. 14/116,058 dated Nov. 21, 2016, 23 pages.
European Search Report for Application No. 16162764.1 dated Aug. 5, 2016, 9 pages.
Official Communication for U.S. Appl. No. 14/116,058 dated Sep. 21, 2016, 3 pages.

\* cited by examiner

CRYPTOGRAPHIC PROTOCOL FOR PORTABLE DEVICES

CROSS-REFERENCE TO RELATED APPLICATIONS

This Utility Patent Application is a Continuation of U.S. patent application Ser. No. 14/949,509 filed on Nov. 23, 2015, now U.S. Pat. No. 9,407,634 issued on Aug. 2, 2016, which is a Continuation of U.S. patent application Ser. No. 14/675,489 filed on Mar. 31, 2015, now U.S. Pat. No. 9,197,414 issued on Nov. 24, 2015, which is a Continuation-in-Part of U.S. patent application Ser. No. 14/461,881 filed on Aug. 18, 2014, now U.S. Pat. No. 9,032,501 issued on May 12, 2015, entitled "CRYPTOGRAPHIC PROTOCOL FOR PORTABLE DEVICES," the benefits of which are claimed under 35 U.S.C. §120, and which are each further incorporated by reference in their entireties.

TECHNICAL FIELD

This invention relates generally to cryptography protocols, and more particularly, but not exclusively, to protocols for authentication and communication for mobile devices.

BACKGROUND

As portable devices continue to proliferate among users, manufacturers and service providers are constantly devising new and useful applications for use with a user's portable devices. Further, in some cases, the portable device may serve as a mechanism for identifying the users. For example, in some cases users may employ applications on their smart phones for interacting with point-of-sale stations, where charges for goods and services may be billed directly to their phone service. In other cases, portable devices may be employed to carry and display user credentials such as event tickets, coupons, boarding passes, or the like. However, in these applications there is another user that helps verify or authenticate that the user present the portable device to purchase items or verify previous purchases is the correct person. Or, in some cases, if the harm that may be caused by mistaken identity is relatively negligible, it may be taken on faith that the portable device is under the control of the legitimate owner. In other words, the access points may be unable to verify that the user of the portable device is the correct person—the person who is the legitimate owner of the portable device. Thus, it is with respect to these and other considerations that these innovations are made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the present innovations, reference will be made to the following Description of the Various Embodiments, which is to be read in association with the accompanying drawings, wherein.

DESCRIPTION OF THE VARIOUS EMBODIMENTS

Figure 1:
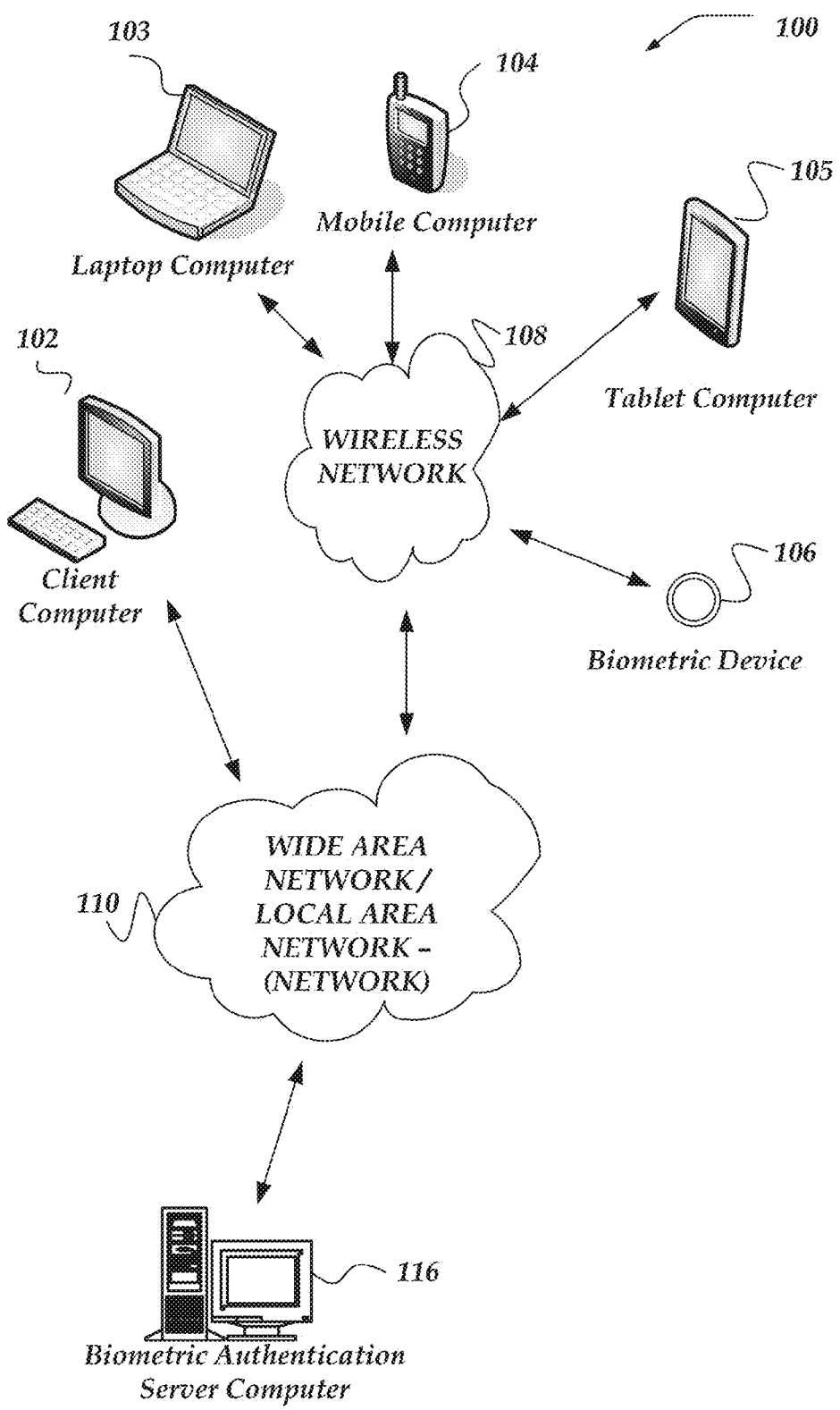
FIG. 1 illustrates a system environment in which various embodiments may be implemented.

The present innovations now will be described more fully hereinafter with reference to the accompanying drawings, which form a part hereof, and which show, by way of illustration, specific embodiments by which the innovations may be practiced. These innovations may, however, be embodied in many different forms and should not be construed as limited to the embodiments set forth herein; rather, these embodiments are provided so that this disclosure will be thorough and complete, and will fully convey the various embodiments to at least those skilled in the art. Among other things, the present innovations may be embodied as methods, computers, or devices. Accordingly, the embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "In one of the embodiments" or "in at least one of the various embodiments" as used herein does not necessarily refer to the same embodiment, though it may. Furthermore, the phrase "in another embodiment" or "in some embodiments" as used herein does not necessarily refer to a different embodiment, although it may. Thus, as described below, various embodiments may be readily combined, without departing from the scope or spirit of the innovations disclosed herein.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

The term "encryption" as used herein is understood to refers to actions that change (information) from one form to another especially to hide its meaning. Further, in some embodiments, encryption as used herein may include employing pseudorandom transformations that produce pseudorandom outputs in the sense that a cipher text may be distinguishable from a completely random sequence of bits of the same length without revealing anything about the plaintext. For example, consider adding one or more zeros at the end of every encryption output. In at least one of the various embodiments, encryption may include applying a pseudo-random function information, where the key of the pseudorandom function may be stored locally on a mobile device.

The term "pseudorandom function" as used herein refers to a function $F(*, *)$ where the first input is a key (that must be random), and the second input can be any value. At least one of its properties is that the output of $F(K, x)$ on any x is indistinguishable from a random value to anyone who does not know K. AES is an example of a conjectured pseudorandom function.

The terms "biometric," "biometric data," or "biometric signal" as used herein are understood to mean any signal that can be obtained from a user that can uniquely identify the user. Non-limiting examples of biometric signals are gait, heart rate, galvanic skin response, temperature, fingerprint, voice or voiceprint, body electrical characteristic, body thermal characteristic, iris pattern, vein pattern, eye vein pattern, facial or other anatomical structure, electrocardiogram, photoplethysmogram, electromyogram, electroencephalogram, transient otoacoustic emissions, phonocardiogram, DNA, one or more chemical markers, one or more biochemical markers, skin-color variation or discolouration, perspiration, or a combination thereof. A unique identity of a user can also be obtained by observing patterns or combinations of more one biometric characteristic. For example a person may have a unique heart rate at a particular temperature and with a particular amount of sweat. In this way, two or more biometric observations can be combined or fused to obtain a multi-modal unique biometric profile. This is especially useful in situations wherein one particular biometric is not sufficient as a standalone identifier. In one example, perspiration and gait can be combined or fused to provide a unique biometric profile for a user. Information from sources that are standalone identifiers can also be combined in order to increase accuracy and/or security. In another example, a multi-modal biometric system may fuse fingerprints with iris and face characteristics.

The term "access point" as used herein refers to any logical or physical gateway, device, or application that requires authorization, such as for security or personalization purposes, and is otherwise locked or inaccessible to the user. Some non-limiting examples of physical access points are electronically locked doors, parking transceivers, smart environment technologies, vehicle doors and transit systems. Some non-limiting examples of logical access points are password, PIN or passcode protected electronic devices or accounts, proof of payment systems, point of sale stations, automated bank teller machines, library checkout systems, and hotel and airport check-in stations. Further, access points may be considered a generic term for applications, computers, terminals, device, or the like, that are enable communicate using the protocols described herein.

The term "authorized authentication device" as used herein refers to access points that may be arranged to include specialized applications for enrolling/registering a mobile device with a user. Authorized authentication devices (AADs) may be arranged to store keys, encryption biometric user profiles, or the like.

The term "provisioning key" as used herein refers to a cryptographic key that corresponds to a mobile device and an access point that are provisioned/paired with each other. The provision key for each provisioned access point may be stored on the mobile device.

The term "provisioning token" as used herein refers to a cryptographic random number that is used during provisioning actions conducted between a mobile device and an access point. The provisioning token may be stored on the mobile device and the access point after provisioning is complete.

The term "session key" as used herein refers to a cryptographic key that is generated for encrypting communication between a mobile device and a provisioned/paired access point.

The term "session nonce" as used herein refers to a cryptographic random number that is used during communication between a mobile device and a provisioned/paired access point.

The term "synchronized time value" as used herein refers to a time value on the mobile device and access points that is synchronized within a defined range of precision. For example, a synchronized time value may be synchronized to within one minute on the mobile device and access points. The synchronization precision range may be configured to be small or larger depending on the application. Also, in at least one of the various embodiments, the synchronization precision may be defined to have different values for different access points depending on the type of access point and/or the application. In at least one of the various embodiments, a mobile device, such as a biometric device may obtain a synchronized time value from its paired authorized authentication device as described in more detail below.

The term "advertising nonce" as used herein refers to a cryptographic random number that is used during presence detection between a mobile device and a provisioned/paired access point. Advertising nonces may be generated on the mobile device and broadcasted to access points.

The term "advertising information" as used herein refers to information generated by a mobile device for identifying and/or authenticating the mobile device to an access point that it has been provisioned with. Advertising information may comprise one or more components, including, advertising nonces, synchronized time values, or the like. One or more, components of the advertising information may be cryptographically encoded and/or hashed.

The terms "advertising packet," or "advertising information packet" as used herein refer to information communicated by a mobile device that includes advertising information. The advertising packet may include advertising information for announcing the presence of the mobile device as well as information, including cryptographic information that may be employed for identifying and/or authenticating the mobile device and its user.

The following briefly describes the embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed towards communicating using a mobile device. In at least one of the various embodiments, a provisioning key and a provisioning token that corresponds to at least one remote access point may be communicated for provisioning the at least one remote access point for communication with the mobile device such that each provisioning key and each provisioning token that corresponds to each provisioned remote access point are locally stored by the mobile device and each provisioned access point.

In at least one of the various embodiments, an advertising nonce and an encrypted advertising nonce may be communicated to a provisioned remote access point such that the provisioned remote access point may be arranged to employ its locally stored provisioning key to decrypt the encrypted advertising nonce and compare the decrypted advertising nonce to the advertising nonce.

In at least one of the various embodiments, if a provisioned access point communicates that the comparison of the advertising nonce and the decrypted advertising nonce match or are otherwise equivalent additional action may be performed including: In at least one of the various embodiments, establishing a communication channel with the provisioned remote access point based on the advertising nonce and a session nonce generated by the provisioned remote access point and its corresponding provisioning key. In at least one of the various embodiments, generating a session key for communicating with the provisioned remote access point based in part on the advertising nonce and a message counter such that the provisioned remote access point generates a remote message counter. In at least one of the various embodiments, encrypting one or more message packets that include a message and a message authentication tag. And, in at least one of the various embodiments, communicating the encrypted message packets to the provisioned remote access point.

In at least one of the various embodiments, provisioning one or more remote access points may further include exchanging a temporary key with the remote access point. In at least one of the various embodiments, generating the provisioning token based on a pseudorandom number. And, in at least one of the various embodiments, generating the provisioning key based on encrypting the provisioning token using a secret key that may be stored on the mobile devices such that the provisioning token may be communicated to the remote access point for verification.

In at least one of the various embodiments, communicating the advertising nonce and the encrypted advertising nonce for the provisioned remote access point may further include generating a separate advertising nonce that may be based on a pseudorandom number. And, in at least one of the various embodiments, encrypting the separate advertising nonce for the provisioned remote access point using its provisioning key.

In at least one of the various embodiments, establishing the communication channel with the provisioned remote access point, may include additional actions. In at least one of the various embodiments, generating the session nonce may be based on a pseudorandom number. In at least one of the various embodiments, generating a modified advertising nonce may be based on flipping one or more predefined bits of the advertising nonce such that the value of the modified advertising nonce may be different than the advertising nonce and other advertising nonces. In at least one of the various embodiments, generating a test value that may be based on encrypting the modified advertising nonce using the provisioning key. And, in at least one of the various embodiments, communicating a 3-tuple that includes the session nonce, the test value, and the provisioning token to the access point.

In at least one of the various embodiments, generating the session key may further include a modified advertising nonce that may be generated based on flipping one or more predefined bits of the advertising nonce such that the value of the modified advertising nonce may be different than the advertising nonce and any other the advertising nonce. And, in at least one of the various embodiments, the session key may be encrypted based on the modified advertising nonce and the provisioning key.

In at least one of the various embodiments, encrypting message packets may further include encrypting the message counter based on the session key. In at least one of the various embodiments, the message may be encrypted based on the encrypted message counter. In at least one of the various embodiments, the message tag may be encrypted by encrypting a portion of the encrypted message using the session key. And, in at least one of the various embodiments, a tuple may be generated that includes the encrypted message and the message tag.

In at least one of the various embodiments, biometric sensor data may be captured using the mobile device. In at least one of the various embodiments, a modified advertising nonce may be generated based on one or more predefined bits of the advertising nonce such that the value of the modified advertising nonce may be different than the advertising nonce and other advertising nonces. In at least one of the various embodiments, another session key may be generated by encrypting the modified advertising nonce using the provisioning key. And, in at least one of the various embodiments, the captured biometric sensor data may be encrypted using the other session key and communicating the encrypted biometric sensor data to the provisioned remote access point.

In at least one of the various embodiments, random number seeds required by the protocols used by the mobile device may be generated based in part on entropy derived from sampling signals from one or more sensors on the mobile device.

In at least one of the various embodiments, random number seeds required by the protocols used by the mobile device may be generated based in part on entropy derived from sampling signals from one or more sensors on the mobile device.

Illustrative Operating Environment

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/wide area networks (WANs)—(network) 110, wireless network 108, client computers 102-105, biometric device 106, biometric authentication server computer 116, or the like.

At least one embodiment of client computers 102-105 is described in more detail below in conjunction with FIG. 2. In one embodiment, at least some of client computers 102-105 may operate over one or more wired and/or wireless networks, such as networks 108, and/or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, access point, authorized authentication device (AAD), or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, smart phones, biometric devices, portable devices, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to receive and to send web pages, web-based messages, and the like. The browser application may be configured to receive and display graphics, text, multimedia, and the like, employing virtually any web-based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), JavaScript Object Notation (JSON), or the like, to display and send a message. In one embodiment, a user of the client computer may employ the browser application to perform various activities over a network (online). However, another application may also be used to perform various online activities.

Client computers 102-105 also may include at least one other client application that is configured to receive and/or send content between another computer and/or an access points. The client application may include a capability to send and/or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), or other device identifier. Such information may be provided in a network packet, or the like, sent between other client computers, biometric authentication server computer 116, or other computers.

Client computers 102-105 may further be configured to include a client application that enables an end-user to log into an end-user account that may be managed by another computer, such as biometric authentication server computer 116, or the like. Such an end-user account, in one non-limiting example, may be configured to enable the end-user to manage one or more online activities, including in one non-limiting example, project management, system administration, configuration management, search activities, social networking activities, browse various websites, communicate with other users, or the like.

Biometric device 106 can be any device that can be worn by a user and is capable of obtaining a biometric signal. Non-limiting examples of suitable wearable biometric devices are a wristband, wristwatch, bracelet, necklace, ring, belt, glasses, clothing, hat, headband or earring(s), or any other wearable item that is capable of obtaining a biometric signal. The biometric device 106 can also be incorporated into clothing. In another embodiment, the biometric device 106 may comprise more than one biometric sensor. Biometric device 106 may be arranged to communicate with one or more of client computer 102-105 over a network, such as wireless network 108. Further, biometric device 106 may be arranged to communicate Wireless network 108 is configured to couple client computers 103-105 and biometric device 106 with network 110. Wireless network 108 may include any of a variety of wireless sub-networks that may further overlay stand-alone ad-hoc networks, and the like, to provide an infrastructure-oriented connection for client computers 103-105 and/or biometric device 106. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G)

5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105, and biometric device 106 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105, biometric device 106, and another computer, network, a cloud-based network, a cloud instance, or the like.

Network 110 is configured to couple network computers with other computers, including, biometric authentication service computer 116, client computers 102-105, biometric device 106 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, and/or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP).

Additionally, communication media typically embodies computer readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media.

One embodiment of biometric authentication server computer 116 is described in more detail below in conjunction with FIG. 3. Briefly, however, biometric authentication server computer 116 includes virtually any network computer capable of performing actions for storing, authenticating, processing of biometric information, users, access points, or the like.

Although FIG. 1 illustrates biometric authentication server computer 116 as a single computer, the innovations and/or embodiments are not so limited. For example, one or more functions of biometric authentication server computer 116 may be distributed across one or more distinct network computers. Moreover, biometric authentication server computer 116 is not limited to a particular configuration such as the one shown in FIG. 1. Thus, in one embodiment, biometric authentication server computer 116 may be implemented using a plurality of network computers and/or client computer. In other embodiments, development computer may operate as a plurality of network computers within a cluster architecture, a peer-to-peer architecture, or the like. Further, in at least one of the various embodiments, biometric authentication server computer 116 may be implemented using one or more cloud instances in one or more cloud networks.

Illustrative Client Computer

Figure 2:
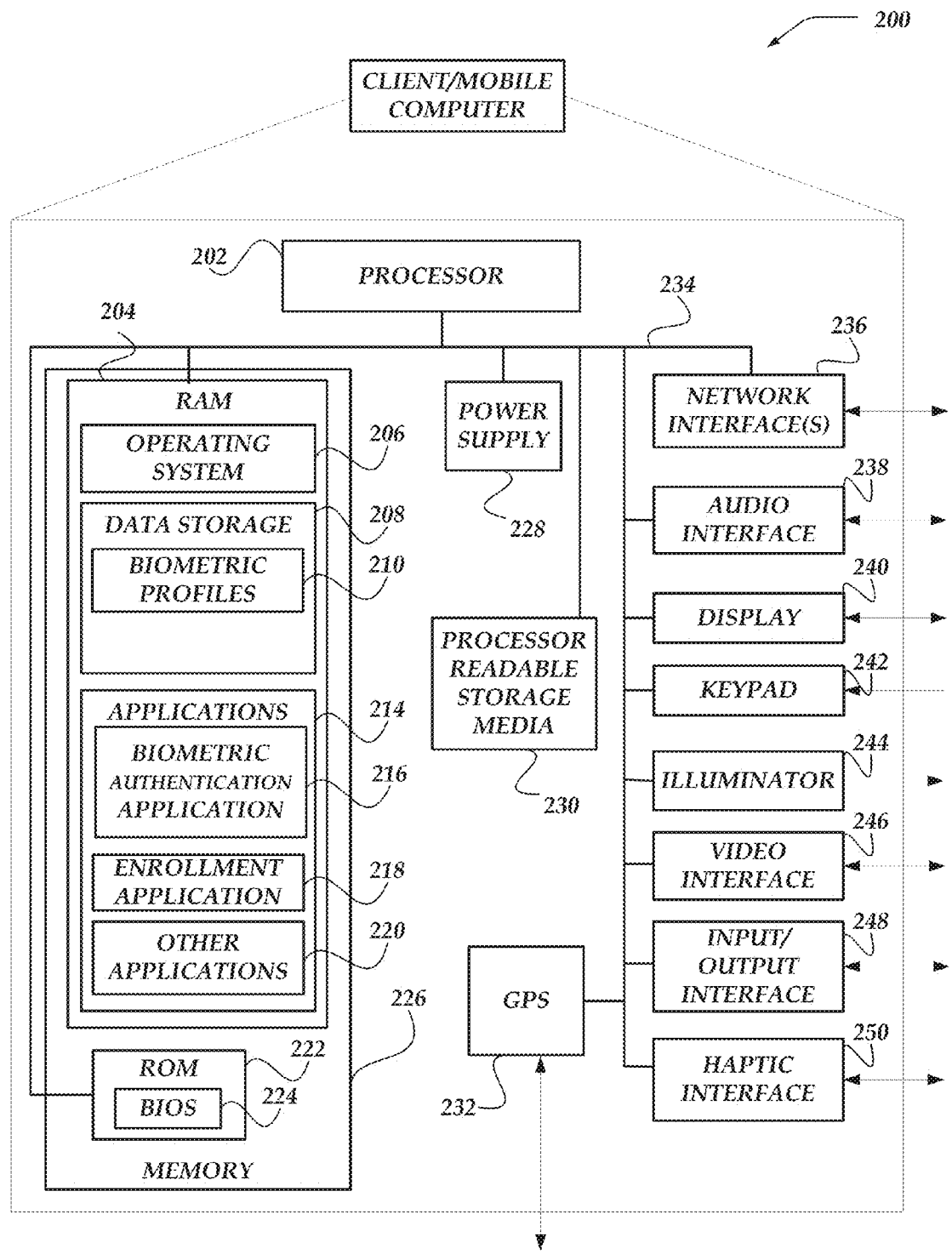
FIG. 2 shows a schematic embodiment of a client computer.

FIG. 2 shows one embodiment of client computer 200 that may be included in a system in accordance with at least one of the various embodiments. Client computer 200 may include many more or less components than those shown in FIG. 2. However, the components shown are sufficient to disclose an illustrative embodiment for practicing the present invention. Client computer 200 may represent, for example, one embodiment of at least one of client computers 102-105 of FIG. 1.

As shown in the figure, client computer 200 includes a processor 202 in communication with a mass memory 226 via a bus 234. In some embodiments, processor 202 may include one or more central processing units (CPU). Client computer 200 also includes a power supply 228, one or more network interfaces 236, an audio interface 238, a display 240, a keypad 242, an illuminator 244, a video interface 246, an input/output interface 248, a haptic interface 250, and a global positioning system (GPS) receiver 232.

Power supply 228 provides power to client computer 200. A rechargeable or non-rechargeable battery may be used to provide power. The power may also be provided by an external power source, such as an alternating current (AC) adapter or a powered docking cradle that supplements and/or recharges a battery.

Client computer 200 may optionally communicate with a base station (not shown), or directly with another computer. Network interface 236 includes circuitry for coupling client computer 200 to one or more networks, and is constructed for use with one or more communication protocols and technologies including, but not limited to, GSM, CDMA, TDMA, GPRS, EDGE, WCDMA, HSDPA, LTE, user datagram protocol (UDP), transmission control protocol/Internet protocol (TCP/IP), short message service (SMS), WAP, ultra wide band (UWB), IEEE 802.16 Worldwide Interoperability for Microwave Access (WiMax), session initiated protocol/real-time transport protocol (SIP/RTP), or any of a variety of other wireless communication protocols. Network interface 236 is sometimes known as a transceiver, transceiving device, or network interface card (NIC).

Audio interface 238 is arranged to produce and receive audio signals such as the sound of a human voice. For example, audio interface 238 may be coupled to a speaker and microphone (not shown) to enable telecommunication with others and/or generate an audio acknowledgement for some action.

Display 240 may be a liquid crystal display (LCD), gas plasma, light emitting diode (LED), organic LED, or any other type of display used with a computer. Display 240 may also include a touch sensitive screen arranged to receive input from an object such as a stylus or a digit from a human hand.

Keypad 242 may comprise any input device arranged to receive input from a user. For example, keypad 242 may include a push button numeric dial, or a keyboard. Keypad 242 may also include command buttons that are associated with selecting and sending images.

Illuminator 244 may provide a status indication and/or provide light. Illuminator 244 may remain active for specific periods of time or in response to events. For example, when illuminator 244 is active, it may backlight the buttons on keypad 242 and stay on while the client computer is powered. Also, illuminator 244 may backlight these buttons in various patterns when particular actions are performed, such as dialing another client computer. Illuminator 244 may also cause light sources positioned within a transparent or translucent case of the client computer to illuminate in response to actions.

Video interface 246 is arranged to capture video images, such as a still photo, a video segment, an infrared video, or the like. For example, video interface 246 may be coupled to a digital video camera, a web-camera, or the like. Video interface 246 may comprise a lens, an image sensor, and other electronics. Image sensors may include a complementary metal-oxide-semiconductor (CMOS) integrated circuit, charge-coupled device (CCD), or any other integrated circuit for sensing light.

Client computer 200 also comprises input/output interface 248 for communicating with external devices, such as a headset, or other input or output devices not shown in FIG. 2. Input/output interface 248 can utilize one or more communication technologies, such as USB, infrared, Bluetooth™, or the like.

Haptic interface 250 is arranged to provide tactile feedback to a user of the client computer. For example, the haptic interface 250 may be employed to vibrate client computer 200 in a particular way when another user of a computer is calling. In some embodiments, haptic interface 250 may be optional.

Client computer 200 may also include GPS transceiver 232 to determine the physical coordinates of client computer 200 on the surface of the Earth. GPS transceiver 232, in some embodiments, may be optional. GPS transceiver 232 typically outputs a location as latitude and longitude values. However, GPS transceiver 232 can also employ other geo-positioning mechanisms, including, but not limited to, tri-angulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 232 can determine a physical location within millimeters for client computer 200; and in other cases, the determined physical location may be less precise, such as within a meter or significantly greater distances. In one embodiment, however, client computer 200 may through other components, provide other information that may be employed to determine a physical location of the computer, including for example, a Media Access Control (MAC) address, IP address, or the like.

Mass memory 226 includes a Random Access Memory (RAM) 204, a Read-only Memory (ROM) 222, and other storage means. Mass memory 226 illustrates an example of computer readable storage media (devices) for storage of information such as computer readable instructions, data structures, program modules or other data. Mass memory 226 stores a basic input/output system (BIOS) 224, or the like, for controlling low-level operation of client computer 200. The mass memory also stores an operating system 206 for controlling the operation of client computer 200. It will be appreciated that this component may include a general-purpose operating system such as a version of UNIX, or Linux™, or a specialized client communication operating system such as Microsoft Corporation's Windows Mobile™, Apple Corporation's iOS™, Google Corporation's Android™, or the like. The operating system may include, or interface with a Java virtual machine module that enables control of hardware components and/or operating system operations via Java application programs.

Mass memory 226 further includes one or more data storage 208, which can be utilized by client computer 200 to store, among other things, applications 214 and/or other data. For example, data storage 208 may also be employed to store information that describes various capabilities of client computer 200. The information may then be provided to another computer based on any of a variety of events, including being sent as part of a header during a communication, sent upon request, or the like. Data storage 208 may also be employed to store social networking information including address books, buddy lists, aliases, user profile information, user credentials, or the like. Further, data storage 208 may also store messages, web page content, or any of a variety of user generated content.

At least a portion of the information stored in data storage 208 may also be stored on another component of client computer 200, including, but not limited to processor readable storage media 230, a disk drive or other computer readable storage devices (not shown) within client computer 200. Further, at least a portion of data storage 208 may be used to store biometric profile information 210 for one or more users and/or one or more biometric devices.

Processor readable storage media 230 may include volatile, non-transitive, non-transitory, nonvolatile, removable, and non-removable media implemented in any method or technology for storage of information, such as computer- or processor-readable instructions, data structures, program modules, or other data. Examples of computer readable storage media include RAM, ROM, Electrically Erasable Programmable Read-only Memory (EEPROM), flash memory or other memory technology, Compact Disc Read-only Memory (CD-ROM), digital versatile disks (DVD) or other optical storage, magnetic cassettes, magnetic tape, magnetic disk storage or other magnetic storage devices, or any other physical medium which can be used to store the desired information and which can be accessed by a computer. Processor readable storage media 230 may also be referred to herein as computer readable storage media and/or computer readable storage device.

Applications 214 may include computer executable instructions which, when executed by client computer 200, transmit, receive, and/or otherwise process network data. Network data may include, but is not limited to, messages (e.g. SMS, Multimedia Message Service (MMS), instant message (IM), email, and/or other messages), audio, video, and enable telecommunication with another user of another client computer. Applications 214 may include, for example, a browser 218, and other applications 220. Further, applications 214 may include biometric authentication application 216, enrollment application 218, or the like.

Browser 218 may include virtually any application configured to receive and display graphics, text, multimedia, messages, and the like, employing virtually any web based language. In one embodiment, the browser application is enabled to employ HDML, WML, WMLScript, JavaScript, SGML, HTML, XML, and the like, to display and send a message. However, any of a variety of other web-based programming languages may be employed. In one embodiment, browser 218 may enable a user of client computer 200 to communicate with another network computer, such as biometric authentication service computer 116 as shown in FIG. 1.

Other applications 220 may include, but are not limited to, calendars, search programs, email clients, IM applications, SMS applications, voice over Internet Protocol (VOIP) applications, contact managers, task managers, transcoders, database programs, word processing programs, software development tools, security applications, spreadsheet programs, games, search programs, and so forth.

In at least one of the various embodiments, client computers may be arranged to include one or more additional components such as those described below. See, FIGS. 4A and 4B.

Illustrative Network Computer

Figure 3:
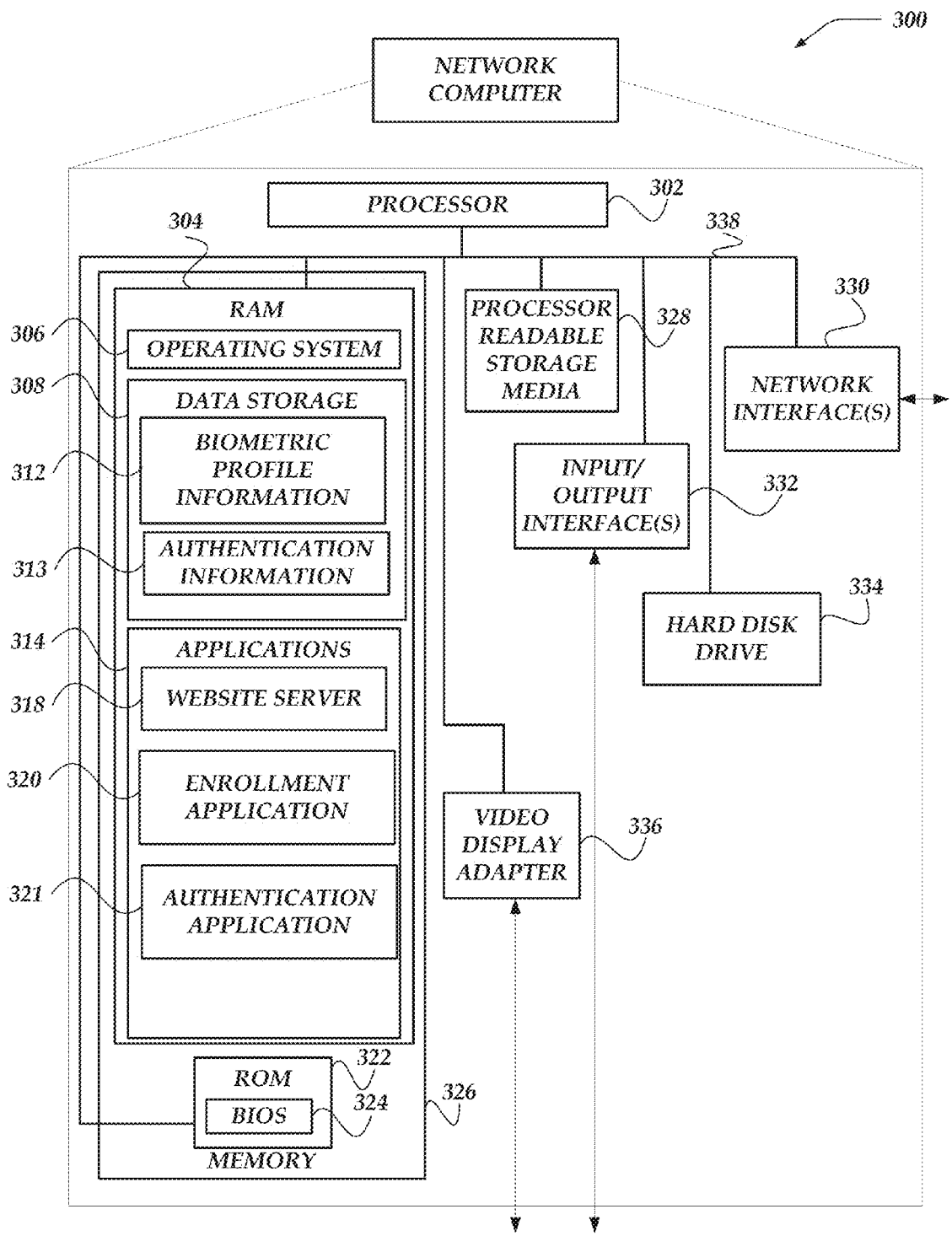
FIG. 3 illustrates a schematic embodiment of a network computer.

FIG. 3 shows one embodiment of a network computer 300, according to one embodiment of the invention. Network computer 300 may include many more or less components than those shown. The components shown, however, are sufficient to disclose an illustrative embodiment for practicing the invention. Network computer 300 may be configured to operate as a server, client, peer, a host, cloud instance, or any other computer. Network computer 300 may represent, for example biometric authentication server computer 116, and/or other network computers.

Network computer 300 includes processor 302, processor readable storage media 328, network interface unit 330, an input/output interface 332, hard disk drive 334, video display adapter 336, and memory 326, all in communication with each other via bus 338. In some embodiments, processor 302 may include one or more central processing units.

As illustrated in FIG. 3, network computer 300 also can communicate with the Internet, or other communication networks, via network interface unit 330, which is constructed for use with various communication protocols including the TCP/IP protocol. Network interface unit 330 is sometimes known as a transceiver, transceiving device, or network interface card (NIC).

Network computer 300 also comprises input/output interface 332 for communicating with external devices, such as a keyboard, or other input or output devices not shown in FIG. 3. Input/output interface 332 can utilize one or more communication technologies, such as USB, infrared, NFC, Bluetooth, or the like.

Memory 326 generally includes RAM 304, ROM 322 and one or more permanent mass storage devices, such as hard disk drive 334, tape drive, optical drive, and/or floppy disk drive. Memory 326 stores operating system 306 for controlling the operation of network computer 300. Any general-purpose operating system may be employed. Basic input/output system (BIOS) 324 is also provided for controlling the low-level operation of network computer 300.

Although illustrated separately, memory 326 may include processor readable storage media 328. Processor readable storage media 328 may be referred to and/or include computer readable media, computer readable storage media, and/or processor readable storage device. Processor readable storage media 328 may include volatile, nonvolatile, non-transitory, non-transitive, removable, and non-removable media implemented in any method or technology for storage of information, such as computer readable instructions, data structures, program modules, or other data. Examples of processor readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by a computer.

Memory 326 further includes one or more data storage 308, which can be utilized by network computer 300 to store, among other things, applications 314 and/or other data. For example, data storage 308 may also be employed to store information that describes various capabilities of network computer 300. The information may then be provided to another computer based on any of a variety of events, including being sent as part of a header during a communication, sent upon request, or the like. Data storage 308 may also be employed to store messages, web page content, or the like. At least a portion of the information may also be stored on another component of network computer 300, including, but not limited to processor readable storage media 328, hard disk drive 334, or other computer readable storage medias (not shown) within network computer 300.

Data storage 308 may include a database, text, spreadsheet, folder, file, or the like, that may be configured to maintain and store user account identifiers, user profiles, email addresses, IM addresses, and/or other network addresses; or the like. Data storage 308 may further include program code, data, algorithms, and the like, for use by a processor, such as processor 302 to execute and perform actions. In one embodiment, at least some of data store 308 might also be stored on another component of network computer 300, including, but not limited to processor-readable storage media 328, hard disk drive 334, or the like.

Data storage 308 may include biometric profile information 312. In at least one of the various embodiments, biometric profile information 312 may include information, such as, one or more files, that include biometric data for one or more users, or the like, used for authentications of wearable biometric devices. Also, in at least one of the various embodiments, data storage 308 may include, authentication information 313 that may include information about users, access points, access control lists, or the like.

Applications 314 may include computer executable instructions, which may be loaded into mass memory and run on operating system 306. Examples of application programs may include transcoders, schedulers, calendars, database programs, word processing programs, Hypertext Transfer Protocol (HTTP) programs, customizable user interface programs, IPSec applications, encryption programs, security programs, SMS message servers, IM message servers, email servers, account managers, and so forth. Applications 314 may also include, enrollment application 320 for enrolling and/or activating biometric devices. Application mat also include authentication application 321 for authenticating users by employ biometric information, biometric devices, additional conditions, or the like.

Website server 318 may represent any of a variety of information and services that are configured to provide content, including messages, over a network to another computer. Thus, website server 318 can include, for example, a web server, a File Transfer Protocol (FTP) server, a database server, a content server, email server, or the like. Website server 318 may provide the content including messages over the network using any of a variety of formats including, but not limited to WAP, HDML, WML, SGML, HTML, XML, Compact HTML (cHTML), Extensible HTML (xHTML), or the like.

Illustrative Architecture

Figure 4A:
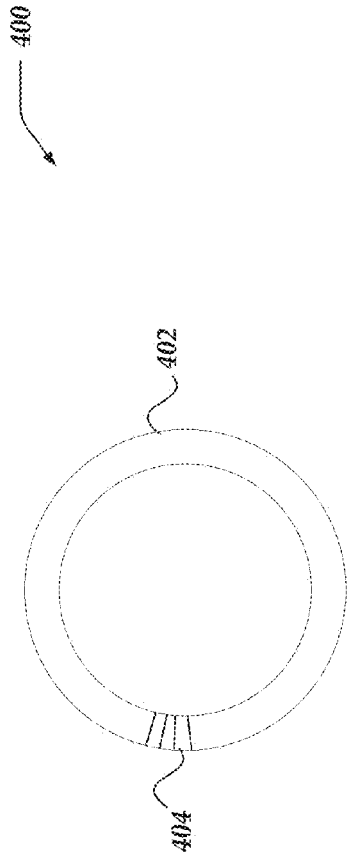
FIG. 4A and FIG. 4B illustrates a logical illustration of a wearable biometric device that is in accordance with at least one of the various embodiments.
Figure 4B:
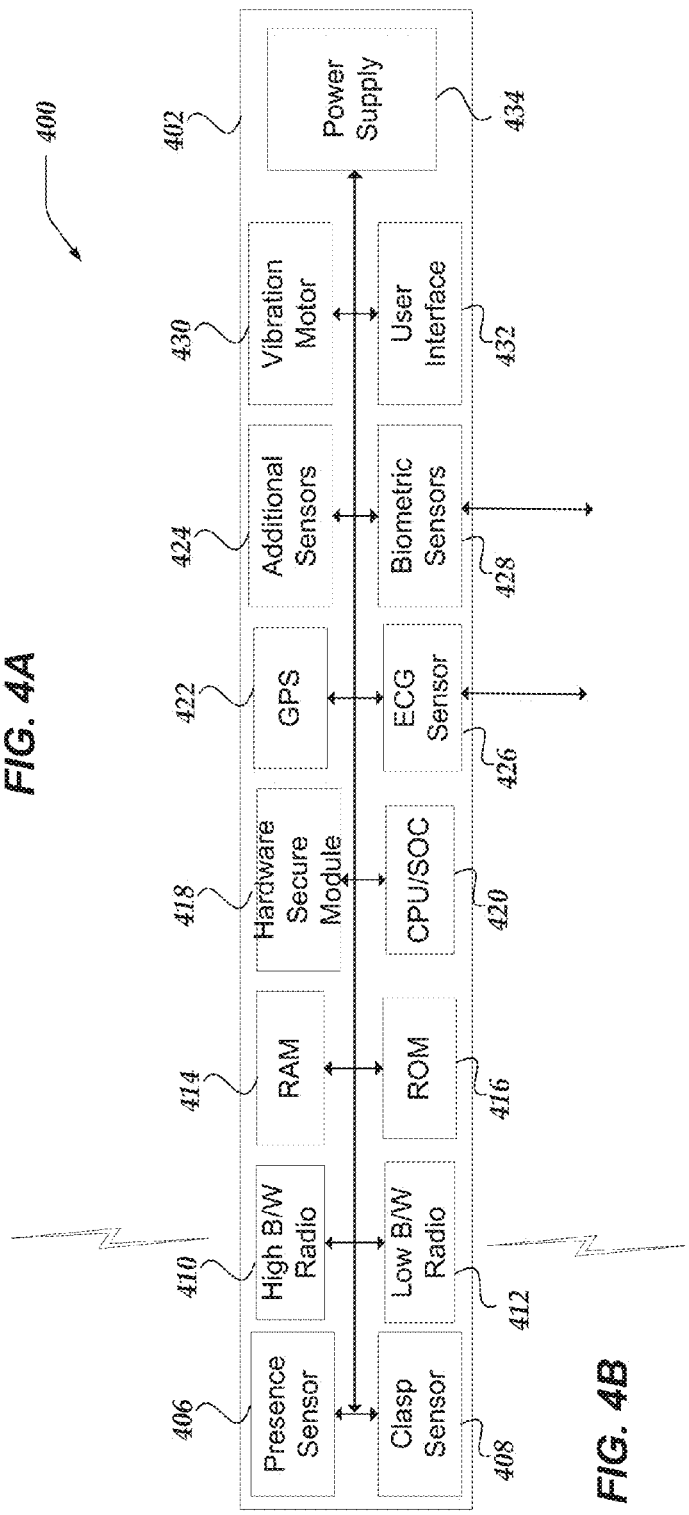

FIG. 4A and FIG. 4B illustrates a logical illustration of a wearable biometric device that is in accordance with at least one of the various embodiments. Biometric device 400 may be an embodiment of mobile computer 200 arranged to include one or more additional sensors and/or components as described below.

FIG. 4A illustrates biometric device 400 that is arranged as a wearable wristband/bracelet. In at least one of the various embodiments, wristband 402 may be arranged to include various hardware components, sensors, and software for capturing biometric signals from its wearer; communication with an access point; authentication of a wearer, or the like, as discussed above. Further, in at least one of the various embodiments, wristband 402 may include an adjustable clasp mechanism, such as, clasp 404, for detecting if a wearable removes wristband 402 from his or her wrist. For example, in at least one of the various embodiments, if a biometric device detects that the clasp is opened, it may automatically de-authenticate itself. In at least one of the various embodiments, resetting and/or de-authenticating biometric device 402 may include erasing it cryptographic state—provisioning keys, session keys, global public keys (for partner cloud services), tokens, advertisement nonces, or the like.

FIG. 4B illustrates a logical view of some of the various components that may comprise a biometric device in accordance with at least one of the various embodiments. In at least one of the various embodiments, wristband 402 may include one or more presence sensors, such as, presence sensor 406, presence sensors may be arranged to determine if a biometric device is in the presence of a wearer, access point, or the like, or combination thereof. Also, in at least one of the various embodiments, biometric device 402 may include one or more radios or transceivers, such as, high bandwidth radio 410 and low bandwidth radio 412. These radios may enable a biometric device to communicate with other computers or devices, such as, access points, biometric authentication servers, or the like, or combination thereof.

In at least one of the various embodiments, clasp sensor 408, may be arranged to determine if the clasp, or other securing mechanism, is opened or closes. In at least one of the various embodiments, an opened clasp may indicate that the biometric device may be separated from its authenticated user. Accordingly, for example, the biometric device may be arranged to automatically reset or otherwise de-authenticate itself if clasp sensor 408 indicates that the biometric device is removed from the wearer. Further, removal of the wearable device may be sensed by the biometric device for example, by opening the clasp, cutting the band, or generally severing an electrical conduit such as an electronic continuity detector. One exemplary electronic continuity detector that may be used to detect device removal comprises of a simple circuit within the wearable device that runs around the entire wrist and is broken when the clasp is opened or the band is cut. Other types of device removal detection may be used, for example, including disruption in skin contact detection by way of conductivity, heat flux, galvanic skin response or motion, or periodic or continuous biometric signal detection. Yet other non-limiting examples of device removal detection embodiments include pulse detection, skin temperature detection, ambient temperature detection, blood flow detection, pressure detection, ambient light detection, electromagnetic field detection, respiration detection, heart rate detection, electrocardiogram detection, photoplethysmogram detection, electromyogram detection, electroencephalogram detection, near infra-red detection, skin-color detection, close magnetic contact detection, and mechanical switch detection.

In at least one of the various embodiments, resetting and/or de-authenticating biometric device 402 may include erasing it cryptographic state—provisioning keys, session keys, global public keys (for partner cloud services), tokens, advertisement nonces, or the like.

In at least one of the various embodiments, as discussed above, biometric device 402 may be arranged to communicate with various devices, such as, access points, biometric servers and cloud services, or the like, or combination thereof. In at least one of the various embodiments, high bandwidth radio 410 may include radios for communication using high bandwidth mechanisms such as Wi-Fi, or the like. Low bandwidth radio 412 may represent components for communicating using low-power, shorter range radio systems such as, Bluetooth, Bluetooth Low Energy, NFC, RFID, or the like, or combination thereof. Further, in at least one of the various embodiments, these radios may be coupled to one or more antennas to facilitate the transmission and reception of wireless signals. Any type of antenna(s) may be used including, for example, a dipole antenna, a patch antenna, a helical antenna, an antenna array, and/or others, including combinations of the above.

In at least one of the various embodiments, RAM 414 may be non-volatile and/or volatile random access memory for storing information for operation of biometric device 402. In at least one of the various embodiments, all or portions of the contents of RAM 414 may be erased if the biometric device is removed of its wearer. Likewise, in at least one of the various embodiments, ROM 416 may contain data and/or instructions for the operation of the biometric device. In at least one of the various embodiments, ROM 416 may be "flashable," enabling it to be updated with system updates provided by an AAD access point or a biometric server service.

In at least one of the various embodiments, hardware secure module (HSM) 418 may represent one or more hardened tamper resistant microprocessor devices that include memory that is resistant to physical tampering. In at least one of the various embodiments, sensitive information such as cryptographic keys may be stored in secure memory 418. Further, in at least one of the various embodiments, HSM 418 may be arranged to provide facilities for generating truly random numbers, key generation, encryption/decryption functions, cryptographic hashing functions, or the like.

In at least one of the various embodiments, biometric device 402 may be arranged to include CPU or System-on-a-Chip (SOC) for controller the operations of the biometric device. The performance capability go CPU/SOC 420 may vary depending on how much processing biometric device 402 is intended to perform.

In at least one of the various embodiments, GPS transceiver 422 may represent the radios, hardware, and instructions (e.g., software) for receiving geo-location. GPS transceiver 422 may determine the physical coordinates of biometric device 402 on the surface of the Earth. GPS transceiver 422 typically outputs a location as latitude and longitude values. However, GPS transceiver 422 may also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of biometric device 402 on the surface of the Earth. It is understood that under different conditions, GPS transceiver 422 may determine a physical location within millimeters for biometric device 402; and in other cases, the determined physical location may be less precise, such as within a meter or significantly greater distances.

In at least one of the various embodiments, additional sensors 424 represent one or more sensor systems including, additional sensors such as accelerometers, motion sensors, proximity sensors, barometric sensors, pressure sensors, thermometers, microphones, near infrared sensors, light sensors, capacitive sensors, gyroscopes, manometers, cameras, humidity sensors, hall sensors, galvanic skin sensors, photoplethysmogram sensors, electroencephalogram sensors, electromyogram sensors, blood flow sensors, bioimpedance sensors, otoacoustic emission sensors, optical sensors, altimeter sensors, UV light sensors, or the like.

In at least one of the various embodiments, as discussed above, biometric device 402 may be arranged to include a variety of biometric sensors for detecting, sensing, and/or sampling a variety of biometric signals from the wearer. ECG sensor 426 represents one or more sensors for detecting, sensing, and/or sampling ECG information as described above. Likewise, biometric sensors 428 represent one or more sensors for detecting, sensing, and/or sampling other biometric information as described above.

In at least one of the various embodiments, biometric sensor 402 may be arranged to include a variety of components for interacting with the wearer. Vibration motor 430 may enable the biometric device to vibrate to notify the wearer of various changes in state, or the like (as discussed above). Likewise, user interface 432 may comprise elements that enable a user to provide input to the biometric device or for receiving output from the biometric device as discussed above, including biometric data that may be employed to uniquely identify a user, such as, gait, heart rate, galvanic skin response, temperature, fingerprint, voice or voiceprint, body electrical characteristic, body thermal characteristic, iris pattern, vein pattern, eye vein pattern, facial or other anatomical structure, electrocardiogram, photoplethysmogram, electromyogram, electroencephalogram, transient otoacoustic emissions, phonocardiogram, DNA, one or more chemical markers, one or more biochemical markers, skin-color variation or discolouration, perspiration, or the like. Also, in at least one of the various embodiments, user interface 432 may include a key pad, buttons, LED's microphone (for voice commands), or the like, or combination thereof.

Also, in at least one of the various embodiments, power source 434 may be arranged to provide power of operating biometric device 402. Power source 434 may include various batteries, storage cells, power adapters, chargers, or the like, as well as, power sources such as, photovoltaic, kinetic, or microgenerator, thermal, piezo-electric generator, inductive charging, and wireless power transfer or the like, or combination thereof.

One or ordinary skill in the art will appreciate that biometric device 402 is a non-limiting example or a biometric device that is in accordance at least one of the various embodiments. Even though biometric device 402 represents a wristband wearable biometric device, biometric devices within the scope of these innovations may be arranged in other form factors, such as those discussed above.

Further, in at least one of the various embodiments, some or all of components described in FIG. 4B and/or elsewhere in this paper may be implemented in hardware, including, dedicated (custom) hardware, ASICs, FPGAs, or the like.

Likewise, these components or portions thereof may be implemented in whole or in part using software.

For example, in at least one of the various embodiments, a wearable device may be arranged to omit features and components related to biometric sensors, biometric signals, or the like. In such embodiments, the preauthorization and/or authentication of the device may be based on non-biometric security factors. However, in the interest of brevity, the term biometric device is used throughout this description even though some wearable devices may be arranged to omit biometric features for authentication and/or preauthorization.

In at least one of the various embodiments, one or more types of sensitive information may be securely stored on the biometric device and/or the AAD access point. In at least one of the various embodiments, protected data on AAD should only be accessible when a paired biometric device is present.

In at least one of the various embodiments, the cryptographic state of the biometric device may comprise of at least four keys. In at least one of the various embodiments, these keys may include:

1. $K_{prgseed}$—the current pseudorandom generator (PRG) seed. If a cryptographic algorithm executing on the biometric device requires randomness, a PRG will be evaluated using this seed, and the seed will be updated.

2. $K_{nea}$—a master key for generating access point provisioning keys.

3. $K_{aad}$—the AAD provisioning key. Used to encrypt and authenticate communications between a biometric device and an AAD.

4. $K_{api}$—a master key for generating signature private keys and (symmetric) secret keys.

In at least one of the various embodiments, the AAD may maintain a secret key $K_{biometric\_device\_state}$ that may be used to encrypt $K_{ned}$ and $K_{api}$. Note, in at least one of the various embodiments, $K_{aad}$ may be stored unencrypted on the biometric device since it is needed to establish a secure channel with the AAD. In at least one of the various embodiments, the seed of the PRG, $K_{prgseed}$, is regenerated using true randomness every time the biometric device restarted or is factory-reset.

In at least one of the various embodiments, the biometric user profile that is stored on the AAD may be encrypted separately under two keys. The first key may be a key that is generated using the secret key facility of the biometric device. In at least one of the various embodiments, the secret key facility outputs two 16-byte values ($ID_K$, K). The AAD may retain $ID_K$, and use it to retrieve K every time that an unauthenticated biometric device establishes a secure channel. The second key $K_{pw}$ is derived from a password, and may be used as a fallback key. Note, that this key may have lower entropy than K. In at least one of the various embodiments, $K_{pw}$ may be derived from a password as described in the Password-Based Key Derivation Function 2 (PBKDF2) that is part of RSA Laboratories' Public-Key Cryptography Standard (PKCS).

Sequence Diagrams

FIGS. 5-8 include sequence diagrams that are useful for clarifying the actions and actors as they participate in the communication protocols. In at least one of the various embodiments, the mobile device referred to in the sequence diagrams may a biometric device such as biometric device 402. Likewise, access points may be computers, applications, mobile devices, or the like, that are enabled to interface with one or more mobile devices in accordance with at least one of the various embodiments.

Figure 5:
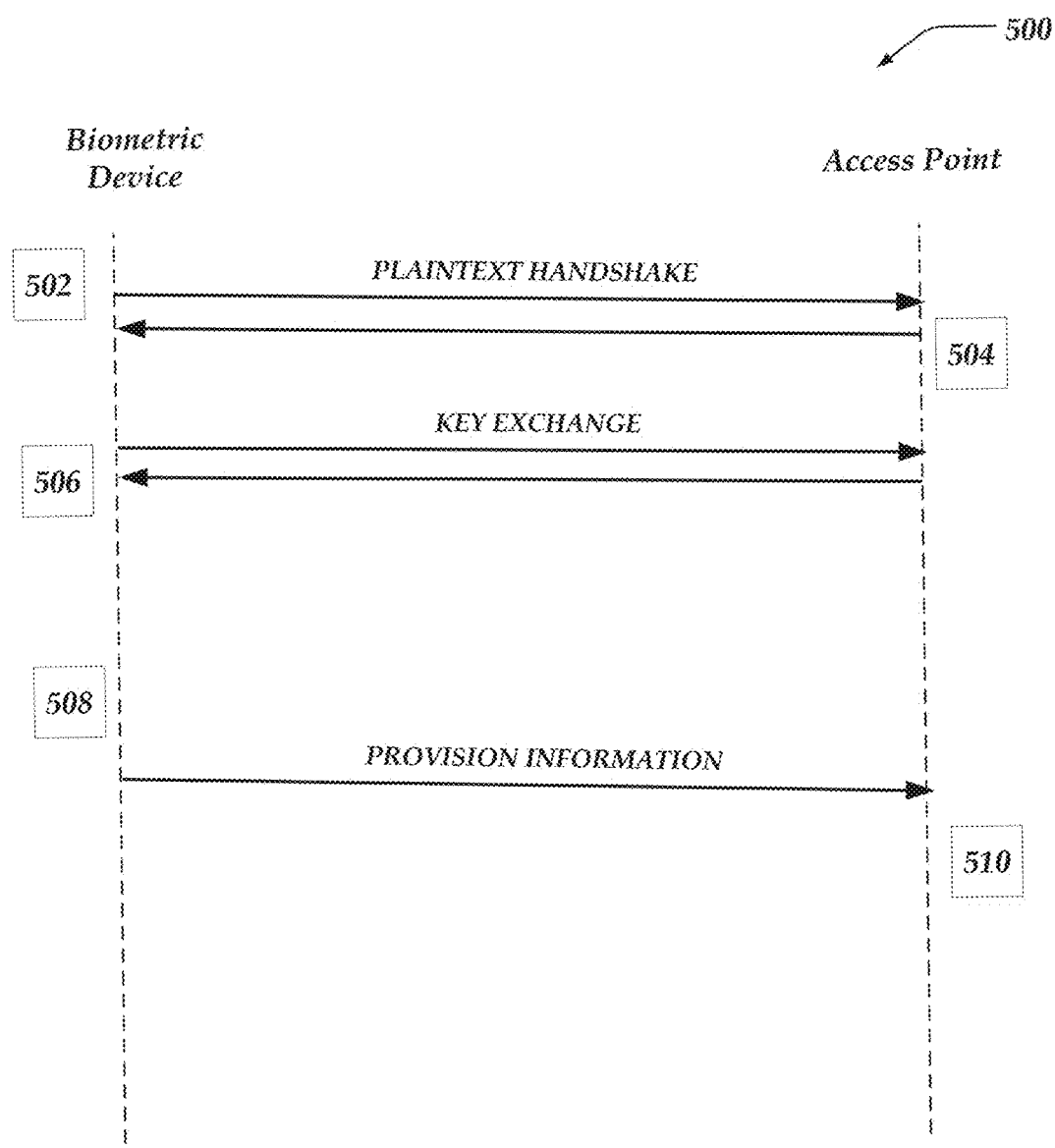
FIG. 5 illustrates a sequence diagram for a sequence for provisioning a mobile device with an access point or other device in accordance with at least one of the various embodiments.

FIG. 5 illustrates a sequence diagram for sequence 500 for provisioning a mobile device with an access point or other device in accordance with at least one of the various embodiments. At step 502, and step 504, in at least one of the various embodiments, a mobile device and the access point may recognize that they may have encountered each other.

In at least one of the various embodiments, this initial communication may be performed using normal operations of one or more radios and/or radio/wireless network protocols that may be included with the mobile device and the access point. In at least one of the various embodiments, this may be a plaintext handshake that establishes a radio and/or network channel for the two devices to communicate. For example, in at least one of the various embodiments, the mobile device and the access point may employ Bluetooth (BT) or Bluetooth Low Energy (BLE) to initiate the provisioning operation.

At step 506, in at least one of the various embodiments, the mobile device and the access point conduct a cryptographic key exchange. In at least one of the various embodiments, one or more cryptographically secure key exchanges may be performed. See, FIG. 9.

At step 508, in at least one of the various embodiments, the mobile device may prepare provisioning information and encrypt it using a cryptographic key that was exchanged in step 506. If the provisioning information is prepared, it may be provided to the access point.

At step 510, in at least one of the various embodiments, the access point may verify and authenticate the provided provisioning information using the cryptographic key that was exchanged in step 506. If the provisioning information is not verified the access point will cancel the provisioning operation. Otherwise, if the provisioning information is verified the provisioning information may be stored for later use.

Figure 6:
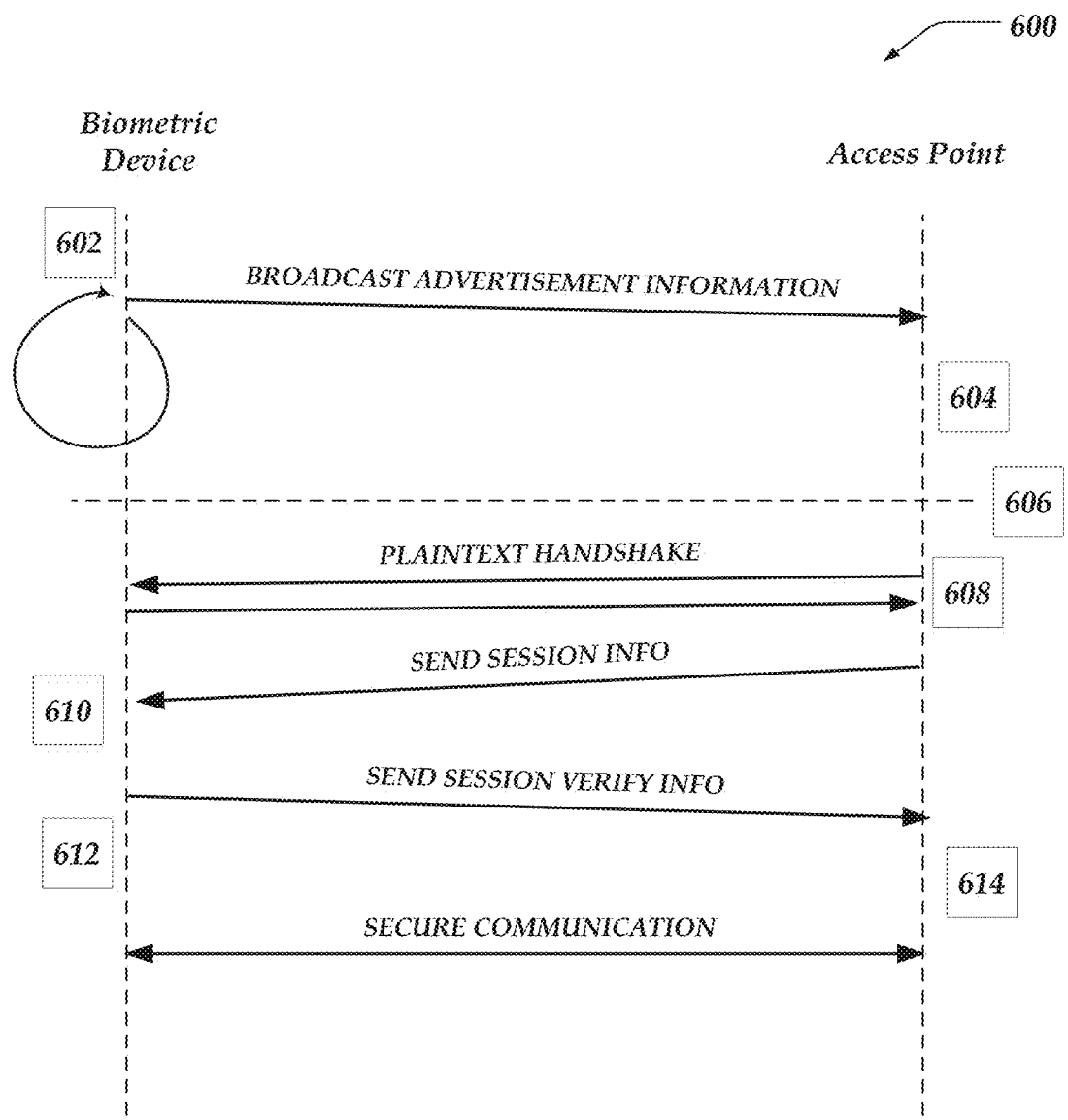
FIG. 6 illustrates a sequence diagram for a sequence for presence advertising in accordance with at least one of the various embodiments.

FIG. 6 illustrates a sequence diagram for sequence 600 for presence advertising in accordance with at least one of the various embodiments. At step 602, in at least one of the various embodiments, the mobile device may broadcast advertising information associated with each of access points it has previously been provisioned with. Accordingly, in at least one of the various embodiments, the mobile device will cycle through each locally stored set of provisioning information (one per access point) waiting for a matching access point that may be in range to respond.

At step 604, in at least one of the various embodiments, access points that are in range of the broadcast will receive the broadcasted advertisement information and attempt to verify that the information is from a provisioned mobile device. In at least one of the various embodiments, if the advertisement information is not verified as being for the current access point, it may be ignored and discarded.

At step 606, in at least one of the various embodiments, if an access point verifies that the mobile device is broadcasting advertising information for that access point, it may initiate further the handshaking steps.

At step 608, in at least one of the various embodiments, the access point and the mobile device may engage in an unauthenticated/unsecure handshake to establish an unauthenticated connection. In at least one of the various embodiments, this connection may be established using standard radio protocols, such as, Bluetooth, BLE, NFC, Wi-Fi, or the like.

At step 610, in at least one of the various embodiments, the access point may cryptographically generate verification/authentication information and provide it to the mobile device. In at least one of the various embodiments, this information may include keys, nonces, tokens, or the like, or combination thereof, that were generated and/or exchanged when the access point was previously provisioned with the mobile device (e.g., provisioning information). In at least one of the various embodiments, part of the advertisement data from 602 may be employed as a random nonce in the protocol of steps 608, 610 reducing the number of communication rounds to two.

At step 612, in at least one of the various embodiments, if the mobile device is able to authenticate the provisioning information provided by the access point, it may generate a response message that cryptographically incorporates a portion of the provisioning information provided by the access point. The response message will be communicated to access point.

At step 614, in at least one of the various embodiments, the access point cryptographically verifies that the response message from the mobile device includes the correct and expected information. If the response is verified, the access point and mobile device may proceed to communicate as needed.

Figure 7:
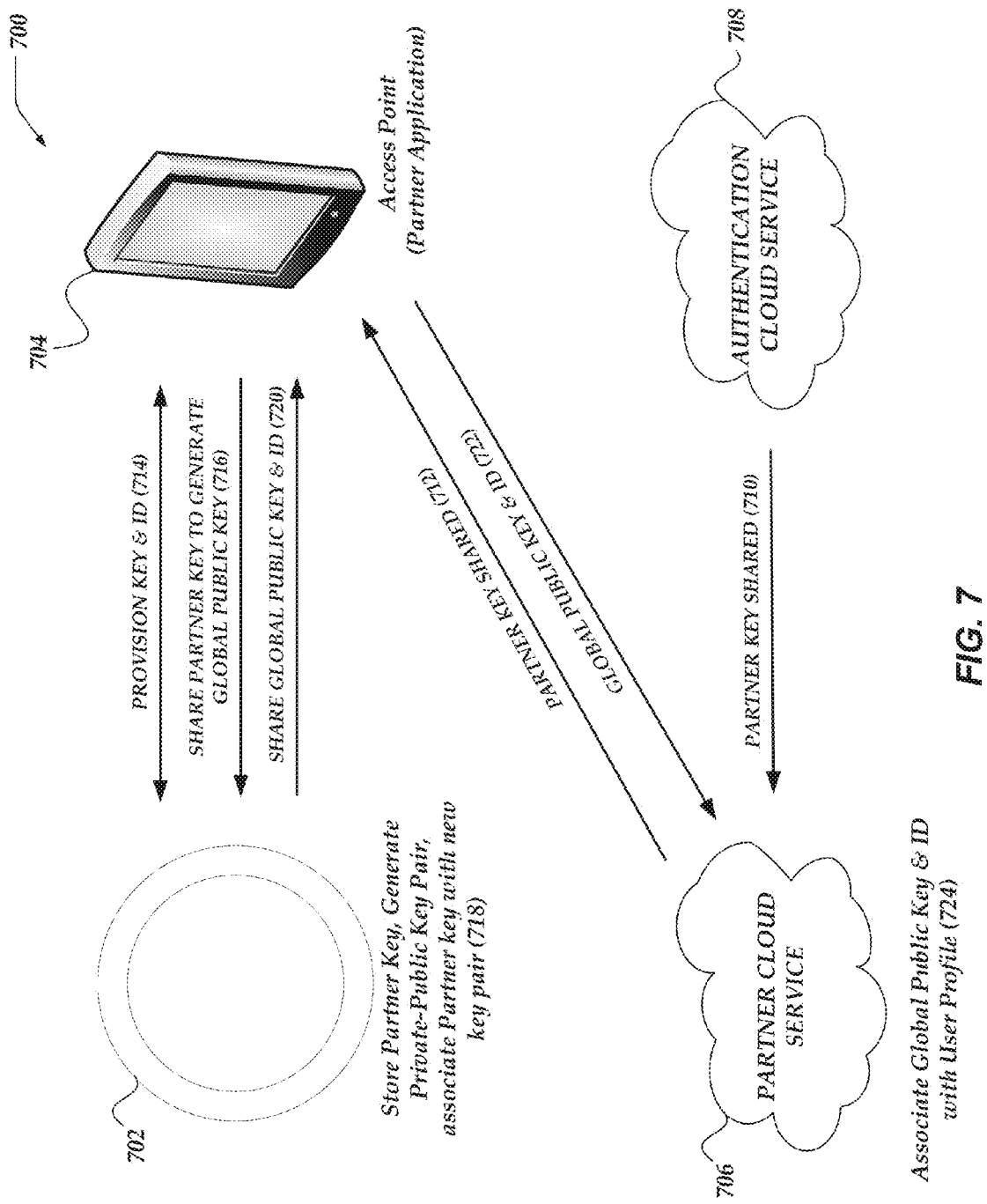
FIG. 7 illustrates a logical diagram of a sequence of operations employed by a system for provisioning a mobile device with a third party cloud service or vendor in accordance with at least one of the various embodiments.

FIG. 7 illustrates a logical diagram of a sequence of operations employed by system 700 for provisioning a biometric device with a third party cloud service or vendor in accordance with at least one of the various embodiments. In at least one of the various embodiments, system 700 may include biometric device 702, access point 704, partner cloud services 706, biometric service cloud servers 708, or the like.

In this illustration, the arrows represent various steps and exchanges that occur in the system. Further, the numbering of the arrows corresponds to the order they may occur. Likewise, they will be described in the order that they may occur.

At step 710, in at least one of the various embodiments, a partner public key will be shared from authentication cloud service 708 and provided to partner cloud service 706. In at least one of the various embodiments, the partner key may be the public key for unique key public-private key pair that is generated specifically for the particular vendor and/or third party service. Further, in at least one of the various embodiments, the authentication cloud service here does not need to be related to biometrics. Instead, in at least one of the various embodiments, its purpose may be for generating partner public-private key pairs, essentially acting a Certificate Authority (CA).

At step 712, in at least one of the various embodiments, the partner public key may be shared from partner cloud service 706 to access point 704. In at least one of the various embodiments, sharing the partner key with the access point enables the access point to have the partner key available for registering biometric devices with the cloud service.

At step 714, in at least one of the various embodiments, access point 704 and biometric device 702 may perform a key exchange to provision a key and its corresponding identifier (ID). In at least one of the various embodiments, the access point may be arranged to perform actions to enroll a biometric device with the access point. However, in at least one of the various embodiments, simply enrolling the biometric device may not register the biometric device with the cloud server.

At step 716, in at least one of the various embodiments, a global public key may be generated and provided to the biometric device. In at least one of the various embodiments, since the access point may be associated with a cloud server, it may communicate a request to the biometric device to generate a global public key. In at least one of the various embodiments, the request from the access point may be communicated using the communication channel established in step 714. Also, in at least one of the various embodiments, access point 704 may provide the partner key with the global public key request.

At step 718, in at least one of the various embodiments, biometric device 702 may store the partner public key. Also, in at least one of the various embodiments, biometric device 702 may generate a private-public key pair that may be associated with the partner public key. In at least one of the various embodiments, the biometric device may generate a new global public pair and associate them with the partner key. In at least one of the various embodiments, the new global key pair will be unique to the particular cloud service that the biometric device may be attempting to register with. In at least one of the various embodiments, the biometric device may generate an alternative identifier (ID) that may be used to reference this particular global key pair. In at least one of the various embodiments, this ID may be smaller (consume less memory) than the global public key. For example, the global public key may be 64 bytes while the ID may be 16 bytes. Accordingly, in at least one of the various embodiments, the ID may be employed to reduce communication bandwidth when global keys are referenced by application.

In at least one of the various embodiments, the global public key pair for the cloud service and its association with a partner key may be stored on the biometric device.

At step 720, in at least one of the various embodiments, biometric device 702 may share the global public key and the ID from step 714 with the access point. In at least one of the various embodiments, biometric device may communicate the global public key and its ID back to the access point using the communication channel established in step 714.

At step 722, in at least one of the various embodiments, the global public key and the ID may be communicated from access point 704 to partner cloud servers 706. In at least one of the various embodiments, access point 704 may be arranged to communicate the global public key and its ID to the partner cloud service. Finally, at step 724, in at least one of the various embodiments, partner cloud service 706 may associate the global public key and the ID with the corresponding user profile. In at least one of the various embodiments, the cloud service may obtain additional information from the access point during the registration process that it may employ to generate a user profile for the user. For example, during registration the access point may request user name, email address, mailing address, telephone number, and so on. This information may be provided to the cloud service for generation of a user profile that may be used for performing the cloud services. Since, the global public key is unique to the cloud service partner and the biometric device, it may be used to associate the user profile (e.g., user account) that is stored in the cloud service with the user of the biometric device.

Figure 8:
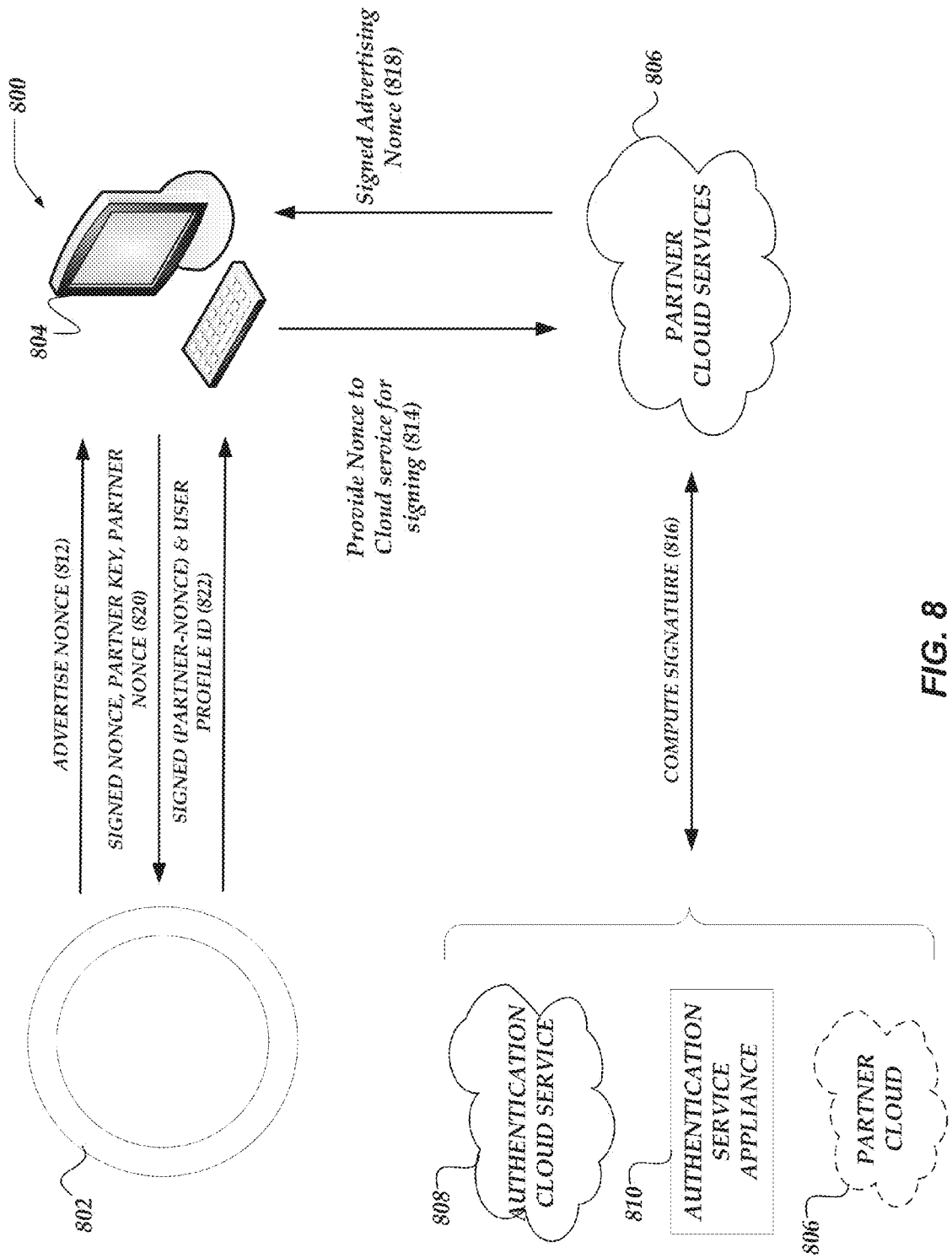
FIG. 8 illustrates a logical diagram of a sequence of operations employed by a system for authenticating a mobile device with a registered third party partner cloud service or partner vendor in accordance with at least one of the various embodiments.

FIG. 8 illustrates a logical diagram of a sequence of operations employed by system 800 for authenticating a biometric device with a registered third party partner cloud service or partner vendor in accordance with at least one of the various embodiments. In at least one of the various embodiments, system 800 may include biometric device 802, access point 804, partner cloud services 806, biometric cloud services 808, biometric service appliance 810, or the like. In this illustration, the arrows represent various steps and exchanges that occur in the system. Further, the numbering of the arrows corresponds to the order the steps may be performed. Likewise, they will be described in the order that they may be performed.

At step 812, in at least one of the various embodiments, biometric device 802 communicates an advertising nonce to access point 804 as per the advertising/presence protocol.

At step 814, in at least one of the various embodiments, access point 804 may communicate the advertisement nonce to partner cloud service 806 for cryptographic signing. In at least one of the various embodiments, the advertisement nonce may be signed using the partner public key.

At step 816, in at least one of the various embodiments, partner cloud services 806 may employ one of various options for signing the advertisement nonce. In at least one of the various embodiments, options for signing the advertisement nonce may include, employing authentication cloud service 808, employing authentication service application 810, or computing the signed advertisement nonce in partner cloud service 806, or the like.

At step 818, in at least one of the various embodiments, a response message that may include a cryptographically signed advertisement nonce signed with the key generated in step 816 may be provided to access point 804.

At step 820, in at least one of the various embodiments, the signed advertisement nonce, partner public key and partner nonce may be communicated from access point 804 to biometric device 802.

At step 822, in at least one of the various embodiments, biometric device 802 may provide the signed partner nonce and a global public key ID, which the partner may have associated with a user profile, back to access point 804. Accordingly, in at least one of the various embodiments, access point 804 may verify that the signed partner nonce is correct, confirming that the user is the correct user.

Generalized Operation

FIGS. 9-14 represent the generalized operations for cryptographic protocols for wearable devices in accordance with at least one of the various embodiments. In at least one of the various embodiments, processes 900, 1000, 1100, 1200, 1300, and 1400 described in conjunction with FIGS. 9-14 may be implemented by and/or executed on a network computer, such as network computer 300 of FIG. 3, client computer 200, and/or mobile device 402, client computers, 102-105, biometric authentication server computer 116, or the like, or combination thereof. Also, in at least one of the various embodiments, one or more of the processes described below may be performed by biometric metric authentication application 216, enrollment application 218, authentication application 321, enrollment application 320, or the like, or combination thereof. Further, in at least one of the various embodiments, the processes described in conjunction with FIGS. 9-14 may perform actions and/or sequences illustrated in FIGS. 5-8.

Furthermore, for brevity and clarity the descriptions below include embodiments and/or examples shown as employing the block cipher AES. One of ordinary skill in the art will appreciate that the processes described below are not limited to the AES cipher may be arranged to employ any cryptographic block cipher.

Figure 9:
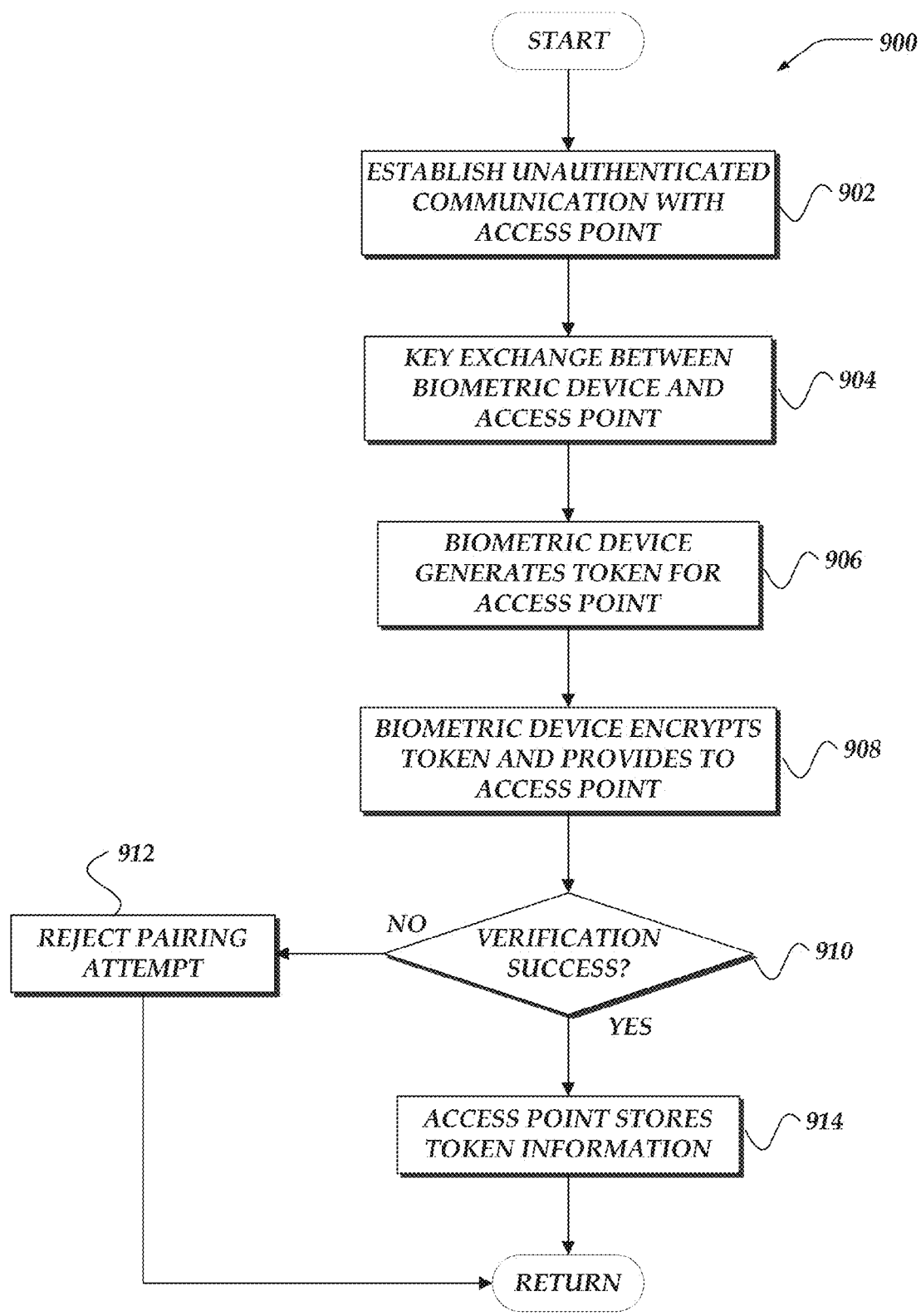
FIG. 9 shows an overview flowchart of a process for provisioning a mobile device with an access point in accordance with at least one of the various embodiments.

FIG. 9 shows an overview flowchart of process 900 for provisioning a mobile device with an access point in accordance with at least one of the various embodiments. In at least one of the various embodiments, process 900 may provision various access points, such as, terminals, kiosks, computers, applications, other devices, or the like, enabling them to communicate with the mobile device.

In at least one of the various embodiments, to save storage space on the mobile device's Bluetooth flash memory, and to allow pairing with a large number of access points, the pairing keys for access points may be generated deterministically by the mobile device using an access point pairing master key $K_{ned}$. Accordingly, in at least one of the various embodiments, the provisioning data for each access point is a tuple, such as, prov=(DeviceId,KID).

In at least one of the various embodiments, if the mobile device enters provisioning mode, it may broadcast a specially formatted message to indicate that it is ready to accept connections from any access point. If an access point connects, the following protocol may be performed. If the connecting access point deviates from the protocol in a detectable way, the mobile device disconnects, and aborts the provisioning attempt.

In at least one of the various embodiments, let $params_{DDH}$ be parameters specifying a prime order group for the purpose of performing a Diffie-Hellman key exchange protocol. In the protocol description below, for clarity and brevity most notation is omitted, except for the explicit use of the group generator g, and the set of integers $\mathbb{Z}_p$ that specify the possible exponents used in the key exchange protocol. One of ordinary skill in the art will be familiar with the Diffie-Hellman key exchange protocol.

After a start block, at block 902, in at least one of the various embodiments, unauthenticated communication may be established with the access point. In at least one of the various embodiments, the mobile device may be arranged to include one or more radios, such as, BLE. The radios may be employed to communicate with an access point to provision with the mobile device. One or more standard/conventional radio communication protocols may be employed to establish an initial communication channel between the mobile device and the access point.

At block 904, in at least one of the various embodiments, the mobile device and the access point may perform a key exchange. In at least one of the various embodiments, to enable cryptographically secure authentication and communication between the mobile device and the access point, the mobile device may initiate a key exchange protocol for exchanging cryptographic keys with the access point.

In at least one of the various embodiments, the mobile device and the access point may perform a Hashed Diffie-Hellman (HDH) key exchange protocol as follows:

(a) Access point chooses a random exponent $x \in_R \mathbb{Z}_p$, computes $h_{AccessPoint} \leftarrow g^x$, and sends $h_{AccessPoint}$ to the mobile device.

(b) the mobile device chooses a random exponent $y \in_R \mathbb{Z}_p$, computes $h_{BiometricDevice} \leftarrow g^y$ and $\sigma_{DRM} \leftarrow DRM(h_{BiometricDevice})$, and sends ($h_{BiometricDevice}$, $\sigma_{DRM}$) to the access point. Here DRM is a function that is used to attest to the authenticity of the mobile device. Specifically, anyone holding an appropriate public key can confirm that $\sigma_{DRM}$ was computed on an original device. The private key needed to compute $\sigma_{DRM}$ is stored in a secure hardware element in the mobile device.

(c) The access point may verify the signature by computing Verify($PK_{DRM}$, $h_{BiometricDevice}$, $\sigma_{DRM}$). If verification fails, the access point disconnects, and aborts the provisioning process.

(d) The access point and the mobile device perform a well-known Short-Authenticated-String (SAS) based Message Mutual-Authentication (MMA) protocol, using the pair ($h_{BiometricDevice}$, $h_{AccessPoint}$) as the message. However, in at least one of the various embodiments, as part of this protocol, the user may be shown a pattern on LEDs on the mobile device, and a matching pattern on the display of the access point. Once the user confirms that the patterns match, this step is completed. If either the protocol itself fails, or the user indicates, either on mobile device, or on the access point, that the patterns do not match, the communication channel between the mobile device and the access point may be closed and the provisioning process may be aborted.

(e) If the above step concludes successfully, both the mobile device and the access point may each compute $K_{tmp} \leftarrow H(g^{xy})$ by computing $H(h^x_{BiometricDevice})$ and $H(h^y_{AccessPoint})$ respectively. Where H is a collision resistant cryptographic hash function, such as, SHA-256, SHA-512, or the like.

One of ordinary skill in the art will appreciate the $K_{tmp}$ may be generated and/or exchanged using other well-known secure key exchange methods.

At block 906, in at least one of the various embodiments, the mobile device may generate a provisioning token. In at least one of the various embodiments, the token may be a pseudo random nonce that may be generated based on the random number protocols described below. See, FIG. 14. The length of the nonce may vary depending on the level of security/attack resistance that may be required. Also, features of the encryption ciphers (key size, block size, or the like) may influence the selection of the length of the nonce. In at least one of the various embodiments, the size of the nonce may be determined from a configuration value stored in the mobile device, or in some embodiments, user input may be employed to determine the length of the nonce. In at least one of the various embodiments, the token may be employed to cryptographically generate a key. For example, in at least one of the various embodiments, the mobile device may generate a 128-bit long pseudorandom nonce $tok_{ned}$ and computes $K \leftarrow AES_{Kned}(tok_{ned})$. Here in this example, the token nonce is encrypted with a block cipher (e.g., AES) using the secret $K_{ned}$ to generate a unique key for the access point that is being provisioned.

At block 908, in at least one of the various embodiments, the mobile device may encrypt the token information and communicate it to the access point. In at least one of the various embodiments, the mobile device may encrypt the token (e.g., $tok_{ned}$) before sending to the access point. In at least one of the various embodiments, the mobile device may compute $C_0 \leftarrow AES_{Ktmp}(K)$, $tag \leftarrow AES_{Ktmp}(AES_{Ktmp}(C_0) \text{ XOR } tok_{ned})$, and send the token information, $C=(C_0, tok_{ned}, tag)$ to the access point. Note, in at least one of the various embodiments, $K_{tmp}$ is the key that was generated and exchanged between the mobile device and the access point in block 904.

At decision block 910, in at least one of the various embodiments, if the access point verifies the encrypted token, control may flow to block 914; otherwise, control of the process may flow to block 912.

In at least one of the various embodiments, the access point may cryptographically verify the token information provided from the mobile device (block 908). In at least one of the various embodiments, if the access point receives C from a mobile device, it may parse C into its constituent components as (C0, $tok_{ned}$, tag). The access point may then verify that $tag=AES_{Ktmp}(AES_{Ktmp}(C_0) \text{ XOR } tok_{ned})$, and rejects the pairing attempt if the verification fails. Note, in at least one of the various embodiments, $K_{tmp}$ is the key that was generated and exchanged between the mobile device and the access point in block 904.

At block 912, in at least one of the various embodiments, since the mobile device failed the verification step, the provisioning attempt is rejected. Next, control may be returned to a calling process. At block 914, in at least one of the various embodiments, since the mobile device is verified, the access point may be stored the token information for future use in other cryptographic protocols discussed below. For example, in at least one of the various embodiments, If the verification is successful, the access point may compute provisioning key $K=AES^{-1}K_{tmp}(C_0)$, and stores the pair $(K, tok_{ned})$ in local storage. Next, control may be returned to a calling process.

Figure 10:
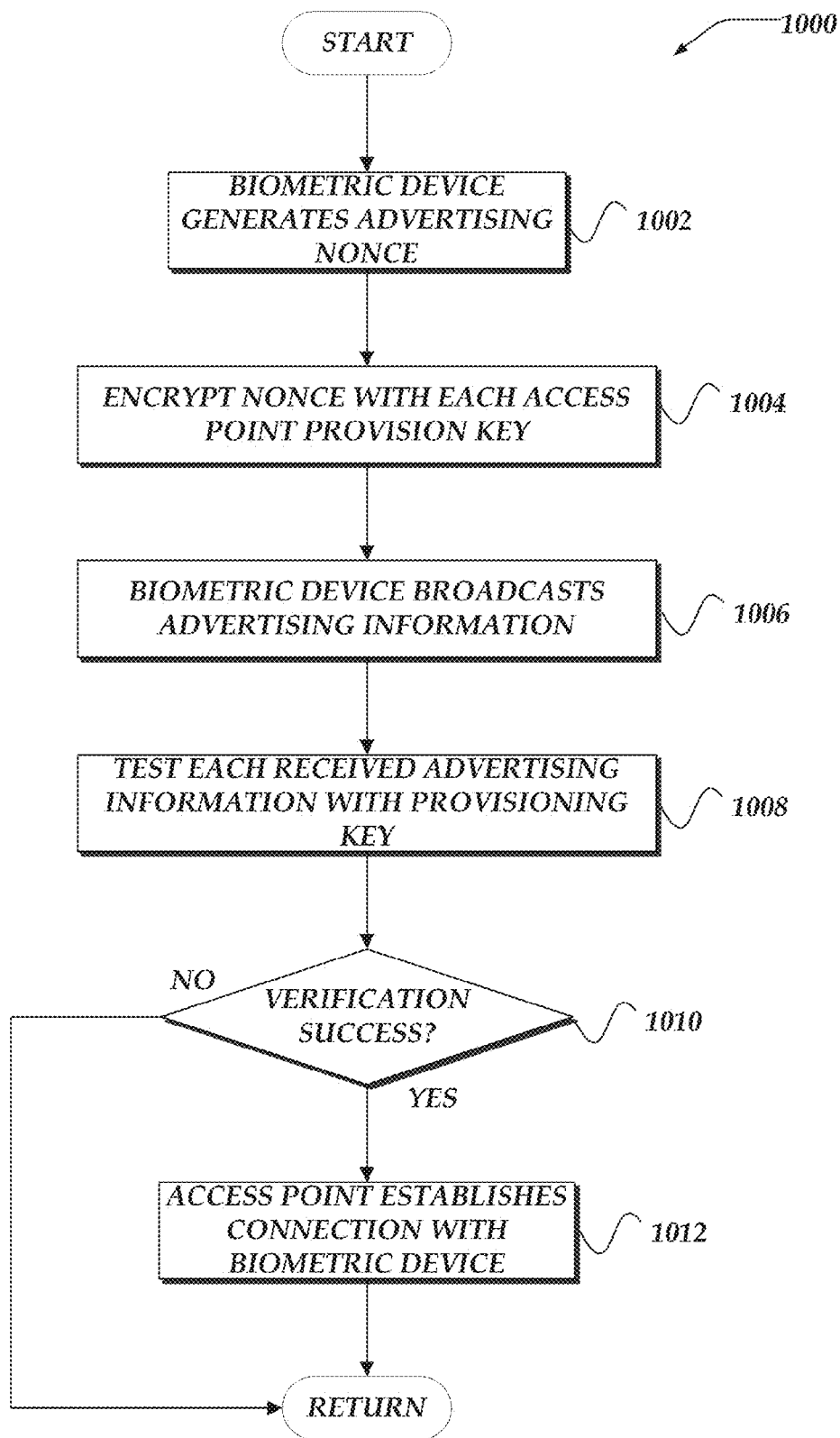
FIG. 10 shows an overview flowchart of a process for presence advertising performed by a mobile device in accordance with at least one of the various embodiments.

FIG. 10 shows an overview flowchart of process 1000 for presence advertising performed by a mobile device in accordance with at least one of the various embodiments. After a start block, at block 1002, in at least one of the various embodiments, the biometric may generate an advertising nonce. In at least one of the various embodiments, the advertising nonce may be a 128-bit long pseudo random number. In at least one of the various embodiments, the mobile device may generate the 128-bit long pseudorandom nonce $n_{adv}$.

At block 1004, in at least one of the various embodiments, the mobile device may encrypt the advertising nonce with each provisioning key from its store of access point provisioning keys. In at least one of the various embodiments, for each provisioned access point key Ki that was generated by the procedure described in FIG. 9, the mobile device computes $\tau_i \leftarrow AES_{Ki}(n_{adv})$.

At block 1006, in at least one of the various embodiments, the mobile device may broadcast the advertising information that includes the advertising nonce and the encrypted nonce. In at least one of the various embodiments, as described above the mobile device may be arranged to include one or more radio communication facilities, such as, Bluetooth, BLE, NFC, or the like. Accordingly, onboard radio may be employed to broadcast the advertising information. In at least one of the various embodiments, the advertising procedure may be performed periodically. The period may be predefined and/or configured duration.

In at least one of the various embodiments, during a broadcast period (e.g., a 15 minute period), the mobile device may broadcast, one at a time, the tuple $(n_{adv}, \tau_i)$ for each i (once for each access point provisioning key). In at least one of the various embodiments, the advertisement information may be changed/rotated to values that correspond to another access point at the expiration of a configured/defined time period (e.g., every 200 ms). Additionally, each mobile device may include in its advertisement information one or more additional strings that may non-cryptographically (e.g., in plain text) identify it as a mobile device.

At block 1008, in at least one of the various embodiments, an access point that receives the encrypted advertising information may cryptographically compare the information to its provisioning keys. In at least one of the various embodiments, an access point may be arranged to continuously listen for transmissions from nearby mobile devices, and for each received value $(n_{adv}, \tau_i)$ to access point may compare whether it has a provisioning key K such that $\tau_i = AES_K(n_{adv})$. This may require trying several keys since each access point may be provisioned with one or more mobile devices each with its own corresponding provisioning key. If no match is found, the access point may assume that it is not provisioned to the mobile device that is advertising its presence.

At decision block 1012, in at least one of the various embodiments, if the access point verifies that the advertising information is associated with a provisioned mobile device, control may flow to block 1012; otherwise, control may be returned to a calling process. At block 1012, in at least one of the various embodiments, the mobile device and the access point may employ the advertising information to communicate. See, FIG. 11. Next, control may be returned to a calling process.

Figure 11:
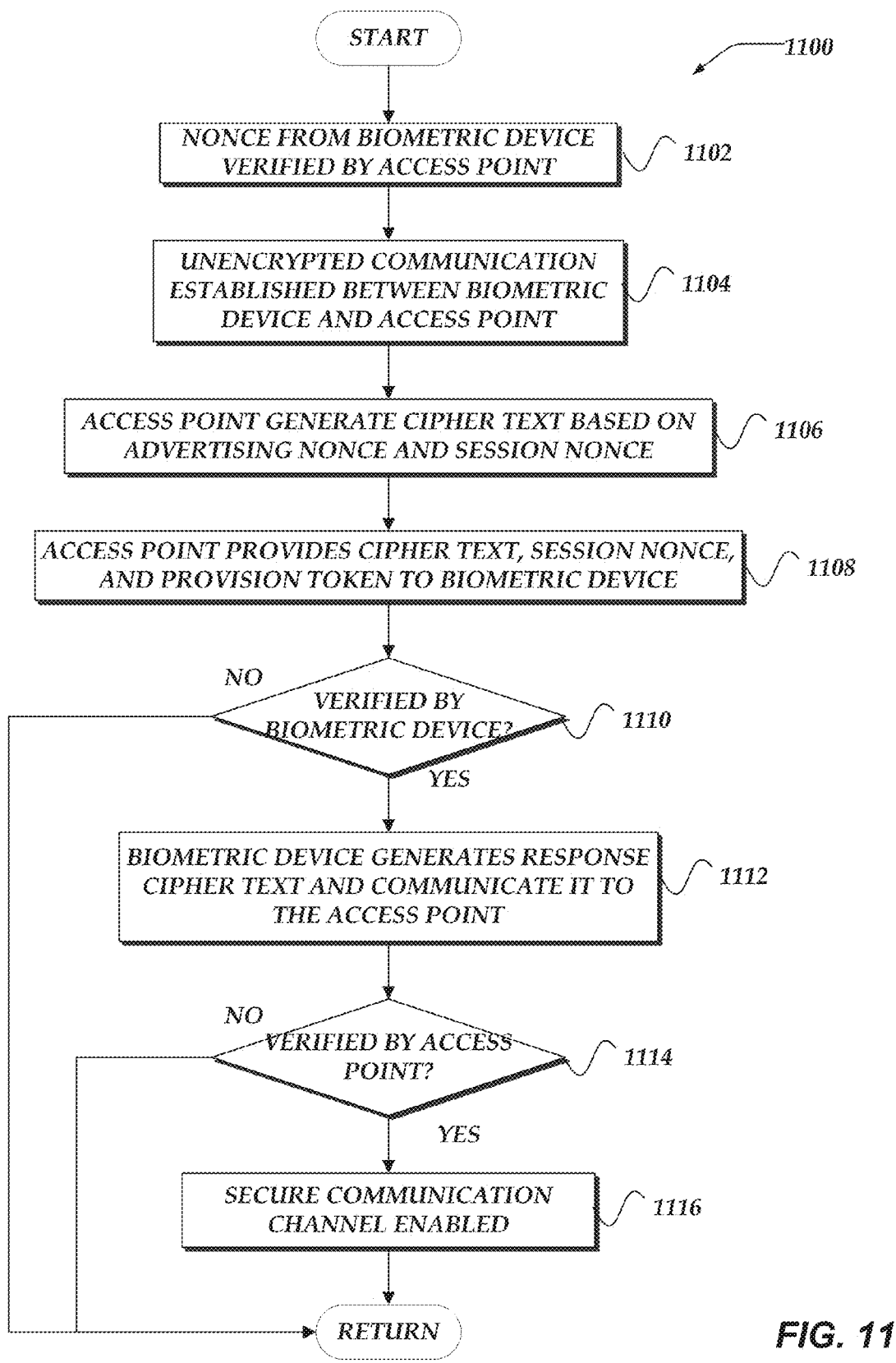
FIG. 11 shows an overview flowchart of a process for establishing a communication channel between a provisioned/paired mobile device and an access point in accordance with at least one of the various embodiments.

FIG. 11 shows an overview flowchart of process 1100 for establishing a communication channel between a provisioned/paired mobile device and an access point in accordance with at least one of the various embodiments. After a start block, at block 1102, in at least one of the various embodiments, the advertising nonce is verified as per FIG. 1000.

At block 1104, in at least one of the various embodiments, an unencrypted communication channel may be established between the mobile device and the access point. In at least one of the various embodiments, the mobile device may be arranged to include one or more radios, such as, Bluetooth, BLE, NFC, Wi-Fi, or the like. Such radios may be employed to communicate with an access point to provision for the mobile device. One or more standard/conventional radio communication protocols may be employed to establish the unencrypted communication channel between the mobile device and the access point.

At block 1106, in at least one of the various embodiments, the access point may generate a cipher text based on the advertising nonce and a session nonce. For example, in at least one of the various embodiments, the access point may compute modified advertising nonce $n^{(1)}_{adv}$ by flipping one or more predefined bits of the advertising nonce, where the value of the modified advertising nonce is different than the advertising nonce and any other. Accordingly, the bits defined for flipping may be determined such that the resulting modified advertising nonce has a different value than other modified advertising nonce used with this access point. For example, in at least one of the various embodiments, the advertising nonce may be modified by flipping the last bit of the previously provided advertising nonce $n_{adv}$. Further, in at least one of the various embodiments, the access point may also generate a random session nonce $n_{ses}$, And, in at least one of the various embodiments, the access point may be arranged to compute test value $t=AES_K(n^{(1)}_{adv})$–encrypting the modified advertising nonce using the provisioning key for this access point.

At block 1108, in at least one of the various embodiments, the access point may provide the t, the session nonce $n_{ses}$, and the provisioning token $tok_{ned}$ to the mobile device. For example, in at least one of the various embodiments, the access point may communicate a 3-tuple such as $(n_{ses}, t, tok_{ned})$ to the mobile device.

At decision block 1110, in at least one of the various embodiments, if the information provided by the access point is verified by the mobile device, control may flow to block 1112; otherwise, the communication attempt may be aborted and control may be returned to a calling process. For example, in at least one of the various embodiments, the mobile device may compute provision key $K=AES_{K_{ned}}(tok_{ned})$, and verify the communication be confirming that $AES_K(n^{(1)}_{adv})=t$.

At block 1112, in at least one of the various embodiments, the mobile device may generate a response cipher text and communicate it to the access point. For example, in at least one of the various embodiments, if the verification in decision block 1110 is successful, the mobile device may compute $t'=AES_K(n_{ses})$ and communicates t' to the access point.

At decision block 1114, in at least one of the various embodiments, if the response cipher text (e.g, t') generated by the mobile device is verified, control may flow to block 1116; otherwise, the communication attempt may be abort and control may be returned to a calling process. In at least one of the various embodiments, the access point may compute $n^{(1)}$ as above, and verify that $t'=AES_K(n_{ses})$. If the verification is successful, the access point may proceed to communicate as needed using the protocol described below. In contrast, if the verification fails, the access point may abort the communication attempt and drop the connection.

Figure 12:
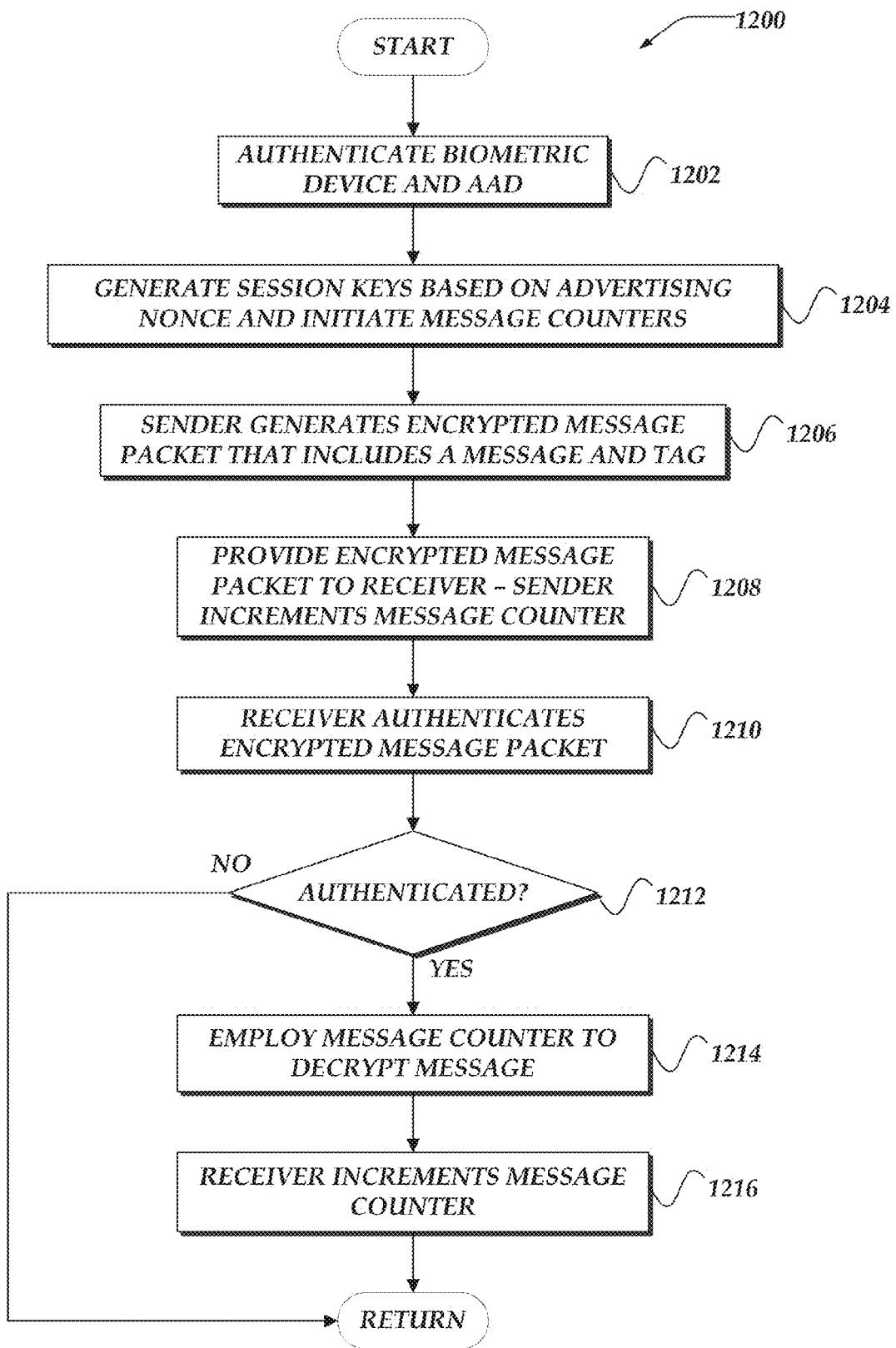
FIG. 12 shows an overview flowchart of a process for communication between a provisioned/paired mobile device and an access point in accordance with at least one of the various embodiments.

FIG. 12 shows an overview flowchart of process 1200 for communication between a provisioned/paired mobile device and an access point in accordance with at least one of the various embodiments. In at least one of the various embodiments, if the mobile device and the access point have completed the protocol as described above, they may encrypt and authenticate messages for communication. In at least one of the various embodiments, messages may be arranged to have a fixed length payload that may be encrypted and authenticated to produce a slightly larger packet. In at least one of the various embodiments, a message payload may be 12 bytes and a complete encrypted message packet may be 20 bytes. In other embodiments, message payload and encrypted message packet size may be larger or smaller. Such sizes may be determined based on a predefined configuration value.

After a start block, at block 1202, in at least one of the various embodiments, the mobile device and the access point may be authenticated with each other using the protocol described in FIG. 9.

At block 1204, in at least one of the various embodiments, session keys may be generated based on an advertising nonce and messages counters may be initiated. In at least one of the various embodiments, both the mobile device and the access point may generate a 16-byte session keys $K_s=AES_K(n^{(2)}_{adv})$ where the modified advertising nonce $n^{(2)}_{adv}$ may be generated by flipping one or more predefined bits of the advertising nonce, where the value of the modified advertising nonce is different than the advertising nonce and any other. Accordingly, the bits defined for flipping may be determined such that the resulting modified advertising nonce has a different value than other modified advertising nonce used with this access point. For example, in at least one of the various embodiments, the advertising nonce may be obtained from the previously provided $n_{adv}$ by flipping the second to last bit of the advertising nonce $n_{adv}$ (note that this guarantees that $n_{adv}$, $n^{(1)}_{adv}$, and $n^{(2)}_{adv}$ are distinct). Also, key K is the provisioning key described above. Additionally, cntr may be a message counter that may be arranged to count the total number of 12-byte messages exchanged between the mobile device and the access point during the current session. Before messages are transmitted for a session, cntr is initialized to 0. Accordingly, cntr is incremented every time a 12-byte message is sent or received. In at least one of the various embodiments, cntr may be restricted to a length of 8 bytes. Thus, in at least one of the various embodiments, the maximum number of messages that may be exchanged in a session may be $2^{64}$. In other embodiments, the message counter may be shorter or longer, with the encrypted message packet size changed accordingly.

At block 1206, in at least one of the various embodiments, the sender may generate an encrypted message packet that includes the message and a tag. For example, in at least one of the various embodiments, Given a 12 byte value m to send, compute $C_1=AES_{Ks}(cntr)[0 \ldots 11]$ XOR m, and compute $t=AES_{Ks}(C_1)[0 \ldots 7]$. Accordingly, the first 12 bytes of $AES_{Ks}(cntr)$ are XOR'd with the 12-byte message m. Likewise, the first 8 bytes of $AES_{Ks}(C_1)$ is used as t.

At block 1208, in at least one of the various embodiments, the encrypted message packet may be provided to the receiver. And, the sender may increment its message counter. Accordingly, in at least one of the various embodiments, set $C=(C_1, t)$ and send C to the receiver.

At block 1210, in at least one of the various embodiments, the receiver may perform actions to authenticate the encrypted message packet. For example, to authenticate and decrypt a received 20-byte encrypted message packet C, set $C_1$ to be the first 12 bytes, and t the last 8 bytes. Then, verify that $t=AES_{Ks}(C_1)[0 \ldots 7]$ where t is the first 8 bytes of $AES_{Ks}(C_1)$. If the verification fails, the message may be rejected and the connection terminated.

At decision block 1212, in at least one of the various embodiments, if the encrypted message packet is authenticated, control may flow to block 1014; otherwise, control may be returned to a calling process.

At block 1214, in at least one of the various embodiments, the receiver of an encrypted message packet may decrypt the message portion that is included in the encrypted message packet. For example, in at least one of the various embodiments, If verification was successful, compute $m=AES_{Ks}(cntr)[0 \ldots 11]$ XOR $C_1$. Note, that for this to work, cntr must have the same value on the sending and receiving sides.

At block 1216, in at least one of the various embodiments, the receiver of the encrypted message packet may increment its message counter. For example, in at least one of the various embodiments, after successfully sending or receiving a message update cntr by setting cntr=cntr+1. Next, control may be returned to a calling process.

Figure 13:
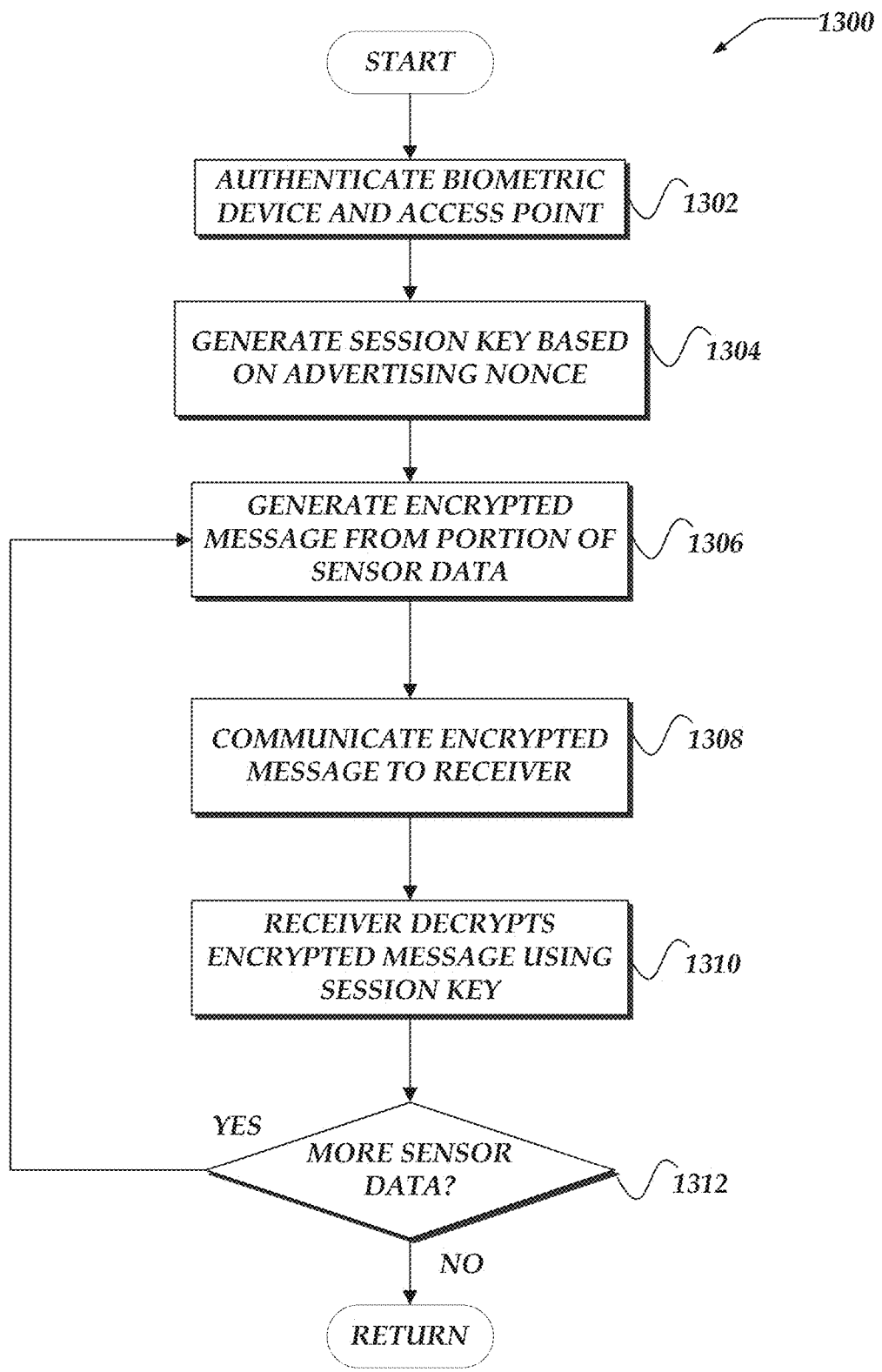
FIG. 13 shows an overview flowchart of a process for communication of biometric data/signals between a paired mobile device and an access point in accordance with at least one of the various embodiments.

FIG. 13 shows an overview flowchart of process 1300 for communication of biometric data/signals between a paired mobile device and an access point in accordance with at least one of the various embodiments. In at least one of the various embodiments, to protect the content of streaming sensor data, a strong pseudorandom-permutation may be applied directly to the streamed data. After a start block, at block 1302, in at least one of the various embodiments, a mobile device and an access point may be paired and authenticated with each other.

At block 1304, in at least one of the various embodiments, the mobile device may generate a session key based on the advertising nonce. For example, in at least one of the various embodiments, a 16-byte session key may be computed such as $K_{su}=AES_K(n^{(3)}_{adv})$ where modified advertising nonce $n^{(3)}_{adv}$ may be generated by flipping one or more predefined bits of the advertising nonce, where the value of the modified advertising nonce is different than the advertising nonce and any other. Accordingly, the bits defined for flipping may be determined such that the resulting modified advertising nonce has a different value than other modified advertising nonce used with this access point. For example, in at least one of the various embodiments, the advertising nonce may be obtained from the previously provided advertising nonce $n_{adv}$ by flipping the second before the last bit of $n_{adv}$ and K is the provisioning key.

At block 1306, in at least one of the various embodiments, an encrypted message may be generated from a portion of sensor data captured by the mobile device. For example, in at least one of the various embodiments, to encrypt a 16-byte message m, compute $C=AES_{Ksu}(m)$. At block 1308, in at least one of the various embodiments, the encrypted message may be communicated to a receiver (e.g., AAD). At block 1310, in at least one of the various embodiments, the receiver may decrypt the message by employing the session key. For example, $m=AES_{Ksu}(C)$. At decision block 1312, in at least one of the various embodiments, if there is more sensor data to send, control may loop back to block 1306; otherwise, control may be returned to a calling process.

In at least one of the various embodiments, the actions of process 1200 may be slightly modified for communicating messages having an arbitrary length. In addition to the session key, a message authentication code (MAC) key may be generated by $K_{mac}=AES_K(n^{(3)}{}_{adv})$ where modified advertising nonce $n^{(3)}{}_{adv}$ is obtained from the previously provided may by flipping the third bit of the advertising nonce $n_{adv}$ (note that this guarantees that $n_{adv}$, $n^{(1)}{}_{adv}$, $n^{(2)}{}_{adv}$, and $n^{(3)}{}_{adv}$ are distinct).

In at least one of the various embodiments, encryption and authentication of messages may be done as follows. To send a message m of l bytes, where l is divisible by the block size (16 in this example), $C=AES\text{-}CTR_{Ks,cntr}(m)$ may be generated, and update cntr←cntr+l/16. Here, $AESCTR_{Ks}$, cntr(m) denotes a block-cipher (AES in this example), chained using the well-known counter mode, where the counter is initialized to cntr. Finally, compute $t=HMAC_{Kmac}(C)$, and send the tuple (C, t) to the recipient. Note, t is computer using a standard hash function based message authentication code (HMAC). In at least one of the various embodiments, other message authentication codes may be employed without departing from the scope of the innovation described herein.

In at least one of the various embodiments, AES-CTR mode may be modified by maintaining the value of the counter as a long-term state for the duration of each session. In other embodiments, normal use of AES-CTR may restart the counter each time a message is sent, allowing an attacker to potentially rearrange messages unless other measures are taken. In at least one of the other embodiments, maintaining the counter throughout the session may avoid the need for additional overhead required to resist message re-ordering.

In at least one of the various embodiments, decryption for arbitrary length messages may be performed as expected. Accordingly, to decrypt, confirm the HMAC by computing it locally as $HMAC_{Kmac}(C)$, where $K_{mac}$ is the receiver's copy of the MAC key, and C is the received ciphertext from the tuple provided by the sender. If the locally computed MAC is equal to t, apply the standard AESCTR (e.g., a block-cipher counter mode) decryption algorithm to C to decrypt the message.

Figure 14:
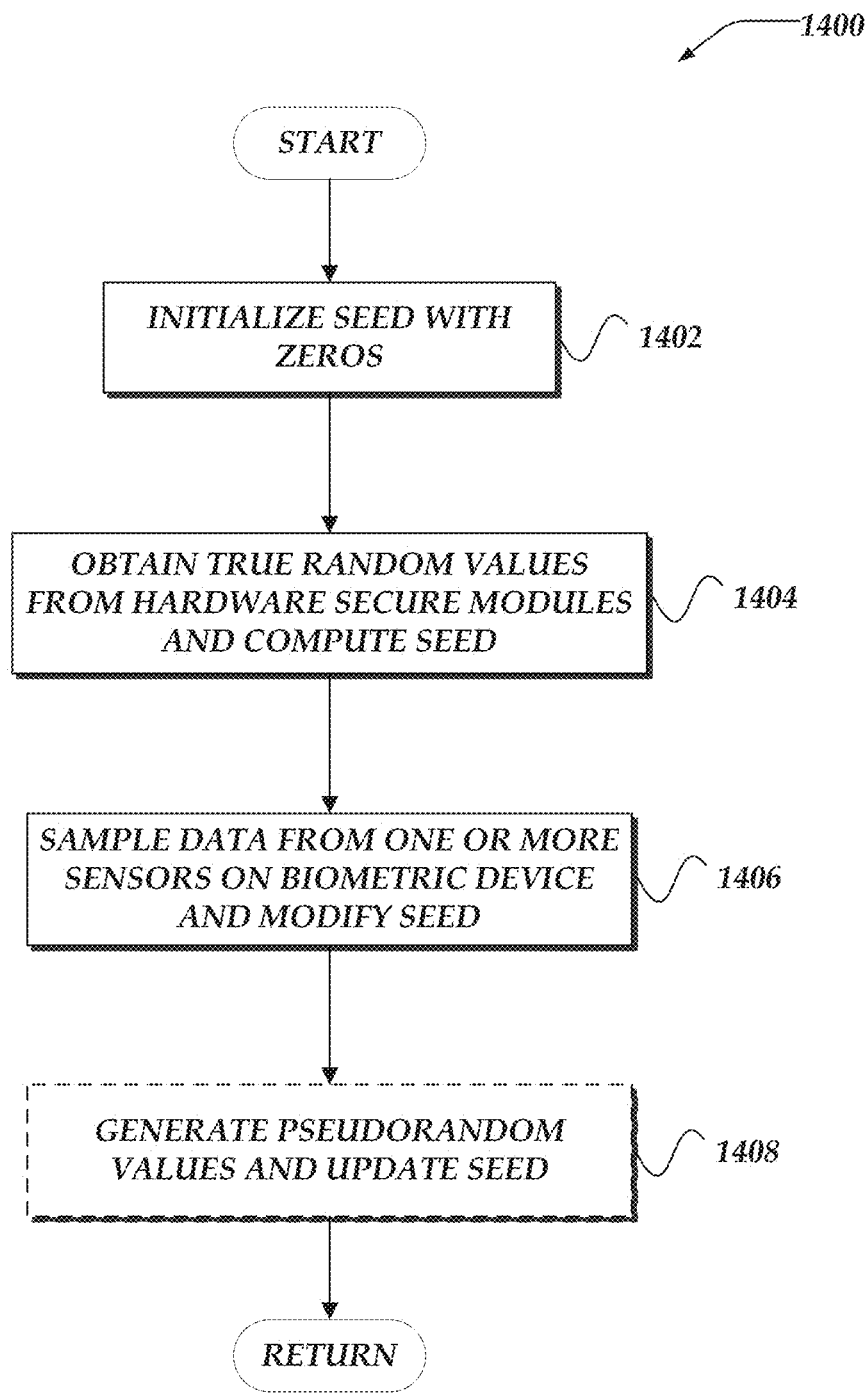
FIG. 14 shows an overview flowchart of a process for generating randomness in accordance with at least one of the various embodiments.

FIG. 14 shows an overview flowchart of process 1400 for generating randomness in accordance with at least one of the various embodiments. In at least one of the various embodiments, randomness may be employed in one or more of the protocols employed by the mobile device to communicate with access points. Accordingly, in at least one of the various embodiments, a mobile device may be arranged to include facilities for generating cryptographically truly random number and cryptographically pseudo-random number.

After a start block, at block 1402, in at least one of the various embodiments, a seed value may be initialized to be all zeros. In at least one of the various embodiments, the seed may be selected to be an appropriate length. For example, the seed length may be selected to conform to the key lengths and/or message lengths for block ciphers, hash function, cipher attack resistance, or the like, or combination thereof. In at least one of the varying embodiments, the seed length may be arranged to be 128-bits. For example, let $K_{prgseed} \leftarrow 00\ldots 0$ be a 128-bit long value initialized with zeros at all positions.

At block 1404, in at least one of the various embodiments, one or more true random values may be obtained from one or more hardware secure modules (HSMs) and employed for computing a random number seed. In at least one of the various embodiments, a mobile device may be arranged to include one or more hardware secure modules. Hardware secure modules are well-known secure, tamper-resistant micro chips systems that are arranged to provide various cryptographic services, such as, true random number generation, key generation, key storage, encryption/decryption support, secure hash functions, or the like, or combination thereof. Accordingly, the services provided by the one or more HSMs may be employed to generate a true random number. In at least one of the various embodiments, the random number seed may be updated from all zeros to a result based on cryptographically hashing the truly random numbers from the HSMs. For example, for each HSM that is available, query the HSM to obtain a true random value $S_{HSM} \in \{0,128\}^{128}$. If the output is shorter than 128 bits, pad $S_{HSM}$ with zeros to length 128. Set $K_{prgseed} \leftarrow H(K_{prgseed}, S_{HSM})$.

At block 1406, in at least one of the various embodiments, one or more of the sensors on the mobile device may be sampled to generate additional entropy that may be employed to modify the random number seed. In at least one of the various embodiments, as discussed above, the mobile device may include one or more sensors, including biometric sensors, and/or environmental sensors. Accordingly, signal and/or data from these sensors may be captured and employed for generating randomness for used in the communication protocols. For example, in at least one of the various embodiments, For each sensor T with a min-entropy of $k_T$ bits per sample, let $k_T=[128/k_T]$. Collect $l=k'_T$ samples $x_1, \ldots, x_l$, and set $K_{prgseed} \leftarrow H(K_{prgseed}, x_1, \ldots, x_l)$.

At block 1408, in at least one of the various embodiments, optionally, pseudorandom numbers may be generated such that the seed is updated using information from the previously generated pseudorandom number. In at least one of the various embodiments, generating pseudo-random number may employ one or more cryptographic operations. In at least one of the various embodiments, steps conforming to forward secure pseudo-random number generation may be employed. However, in at least one of the various embodiments, other cryptographically secure pseudo random number generating methods may be employed. In at least one of the various embodiments, each time a pseudo-random number is generated, the random number seed (e.g., $K_{prgseed}$) may be updated based on the previously generated pseudo-random number, or the like.

For example, in at least one of the various embodiments, To generate n 128-bit long pseudorandom values $r_1, \ldots, r_n$:

1. Compute $r_i \leftarrow AES_{Kprgseed}(i)$, where i ranges from 0 to n.
2. Update $K_{prgseed}$ in the flash memory by setting $K_{prgseed} \leftarrow r_0$.
3. Return $r_1, \ldots, r_n$.

Next, control may be returned to a calling process.

Secure Advertising

In at least one of the various embodiments, a modified advertisement protocol may be arranged to enable multiple access points to simultaneously and securely detect a provisioned mobile device's presence without establishing a connection between the mobile device and the access points. Further, in at least one of the various embodiments, the advertisement protocol may be arranged to thwart replay attacks.

Figure 15:
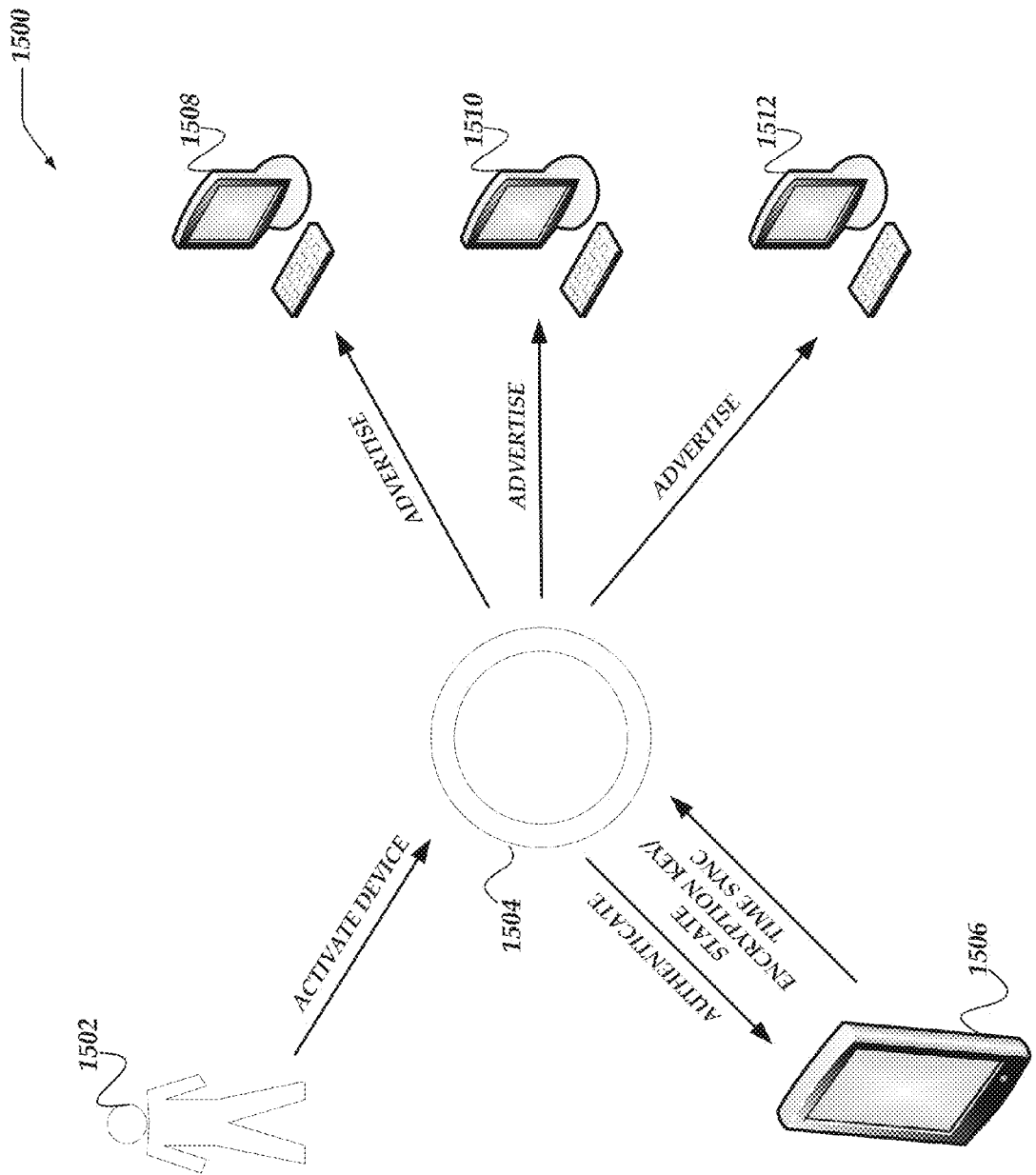
FIG. 15 logically illustrates a system that may be arranged to simultaneously advertise a provisioned mobile device to multiple access points, in accordance with at least one of the various embodiments.

FIG. 15 logically illustrates system 1500 that may be arranged to simultaneously advertise a provisioned mobile device to multiple access points, in accordance with at least one of the various embodiments. In at least one of the various embodiments, if a user, such as, user 1502, activates a mobile device, such as, mobile device 1504, the mobile device will need to be reinitialized. In this example, mobile device 1504 may be reinitialized by communicating with an authorized authentication device (AAD), such as, mobile computer 1506. In at least one of the various embodiments, the authentication procedure may include communication information, such as, a biometric signal, PIN number, gesture information, cryptographic information, or the like, or combination thereof from mobile computer 1502. In at least one of the various embodiments, the AAD (mobile computer 1506) may be arranged to required additional information from a user for authentication, for example, the AAD may require the user to enter a password, pass phrase, PIN number, additional biometric signals, perform one or more gestures, or the like, or combination thereof, to authenticate a biometric device, such as, mobile computer 1504.

Further, in at least one of the various embodiments, the biometric device (mobile computer 1504) may be provided time sync information to initiate a clock timer to the current time as reported by mobile computer 1506.

In at least one of the various embodiments, authenticated biometric devices, such as, mobile computer 1504, may communicate advertisement signals, that enable access points to detect the device. In at least one of the various embodiments, access points, such as, computer 1508, computer 1510, computer 1512, or the like, may be arranged to monitor one or more advertising channels to detect the presence of a provisioned biometric device, such as, mobile computer 1504.

Figure 16:
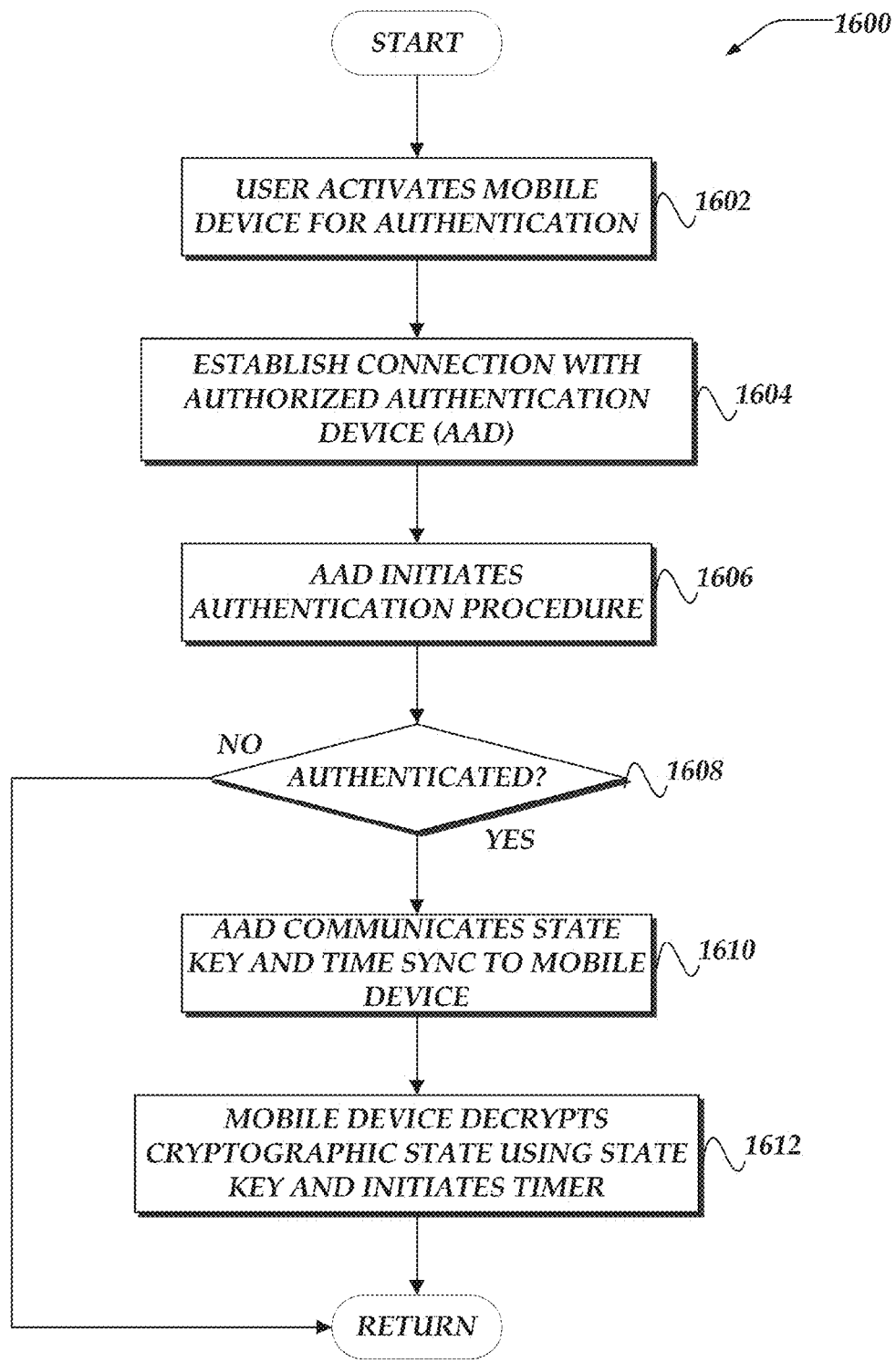
FIG. 16 illustrates an overview flowchart for a process that may initialize a mobile device to perform secure advertisement in accordance with at least one of the various embodiments.

FIG. 16 illustrates an overview flowchart for process 1600 for initializing a mobile device to perform secure advertisement in accordance with at least one of the various embodiments. At a start block, at block 1602, in at least one of the various embodiments, a user may activate a mobile device to enable it to perform authentication/validation. In at least one of the various embodiments, the mobile device, may be a mobile computer, such as, biometric device 400. Accordingly, in at least one of the various embodiments, device may be activated if the user begins wearing the device and secures the clasp of the device. In at least one of the various embodiments, different mobile devices may include other mechanism for determining if the user is activating the device. For example, a mobile device may be activated if an onboard biometric sensor detects a heartbeat, body temperature of a wearer, movements and/or gestures, or the like, or combination thereof.

In at least one of the various embodiments, an activated mobile device may be "turned on" or otherwise ready to perform some functions, but its wearer is not authenticated. Though, the device may be ready to perform one or more actions to authenticate the user.

At block 1604, in at least one of the various embodiments, the mobile device may establish a connection with an authorized authentication device (AAD). In at least one of the various embodiments, the AAD may be another mobile computer, such as, AAD 1506 shown in FIG. 15. In at least one of the various embodiments, the AAD may be any type of mobile computer, client computer, cloud computer (a virtualized computer located in a cloud computing environment), In some embodiments, the mobile device may perform the function of and AAD obviating the need to connect to a separate computer.

In at least one of the various embodiments, the mobile device may establish a connection using a wired or wireless network connection via one or more transceivers and/or network interfaces, including, short-range/low power networks, such as, Bluetooth LE, Bluetooth, Near Field Communication, or the like, or combination thereof.

At block 1606, in at least one of the various embodiments, the AAD may initiate an authentication procedure to authenticate the user. In at least one of the various embodiments, the mobile device may communicate one or more biometric signals that may be captured by the mobile device to the AAD. In at least one of the various embodiments, the biometric signal may include any signal such as those described above. Further, in at least one of the various embodiments, the AAD may demand that additional information, such as, passwords, PIN, pass phrases, be provided by the user. For example, in at least one of the various embodiments, if the AAD is a mobile computer, authentication may be performed by an application that may generate a user-interface to collect the additional information needed for authenticating the user.

At decision block 1608, in at least one of the various embodiments, if the user is authenticated, control may flow to block 1610; otherwise, control may return to calling process.

At block 1610, in at least one of the various embodiments, the AAD may communicate a cryptographic state key and a time synchronization value to the mobile device. In at least one of the various embodiments, the cryptographic state key may be provided by the AAD that enables the mobile device to decrypt its locally stored state information. Otherwise, absent the state key, the mobile device may be unable to access the state information which includes the various cryptographic keys, identifies, or the like, that may be necessary for performing the communication protocols discussed herein. See, description for FIG. 4B for a description of the protected data, such as, cryptographic state and user profiles that may be located on the mobile device.

In at least one of the various embodiments, the synchronized time value may be a timestamp or represent of the current time. In at least one of the various embodiments, it may be represent in various formats, including, UNIX time, Julian, or the like, or combination thereof. In at least one of the various embodiments, the time source may be a networked time source that may be accessible by one or more access points. Also, in at least one of the various embodiments, the time value may be selected such that it will be reasonably closely synchronized with access points that the mobile device may be expected to interact with. In at least one of the various embodiments, level of synchronization may be considered reasonable if the time/clocks on the involved devices are synchronized within a defined time range precision, such as, a specified number of minutes, or the like. E.g., 1 minute, 2 minutes, 10 minutes, and so on.

At block 1612, in at least one of the various embodiments, the mobile device may decrypt its cryptographic state the state key provided by the AAD and initialization a timer/clock to the value of the provided time synchronization value. Decrypting the cryptographic state gives the mobile device access to the identifiers and keys associated with the one or more access points that the mobile device may be provisioned with (See, FIG. 9 and accompanying description). In at least one of the various embodiments, at this point, the mobile device may be ready to advertise its presence to enable access encountered access points. Next, control may be returned to a calling process.

In at least one of the various embodiments, if the AAD is not paired with the mobile device, an authentication application running on the AAD may perform additional steps to initialize and/or authenticate the user. For example, in at least one of the various embodiments, the AAD may be a personal mobile computer such as mobile phone (smart phone), accordingly possession of the AAD may be considered as authenticating its user since the AAD security features have to be satisfied for the user to employ the pairing/activation process.

Figure 17:
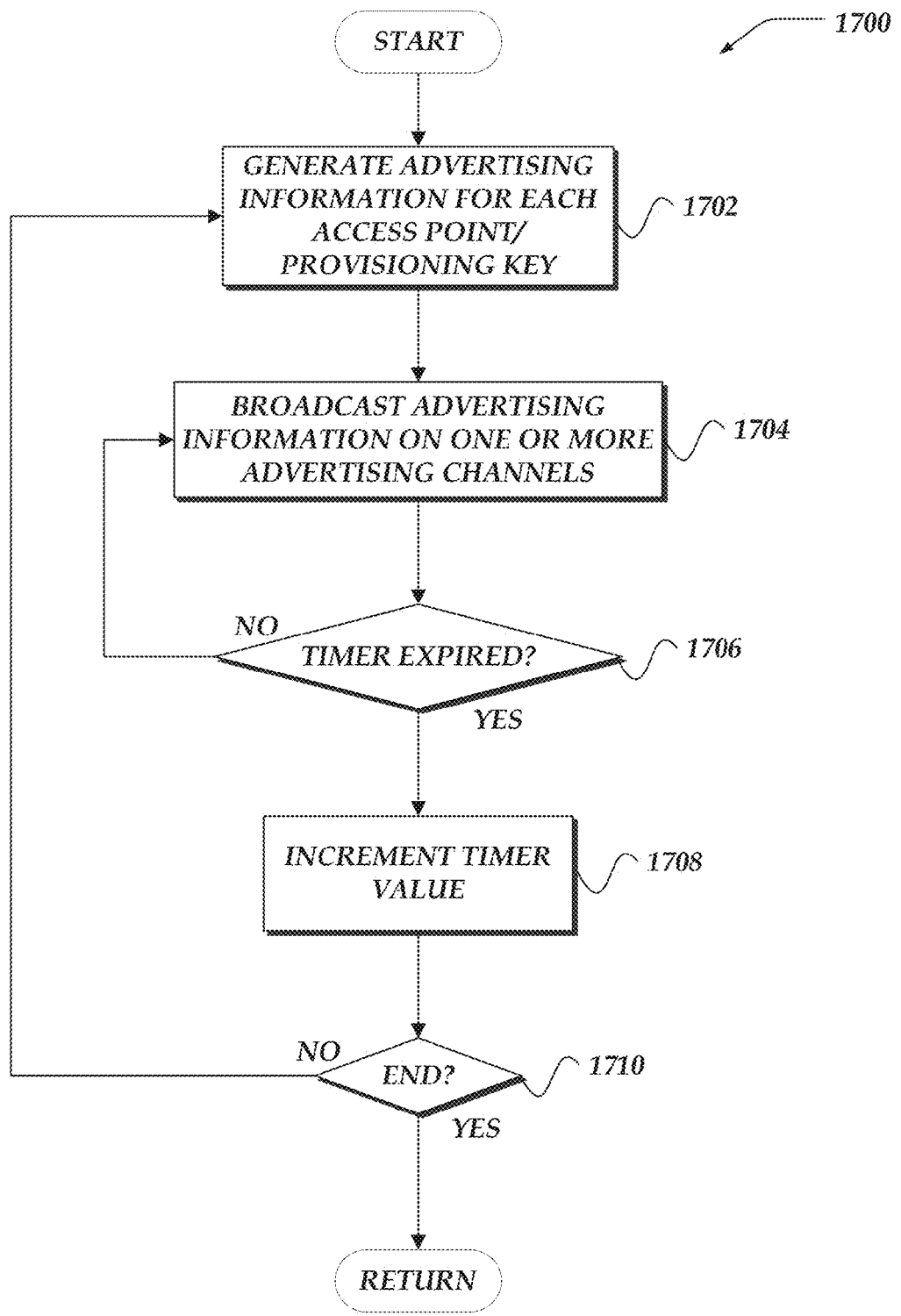
FIG. 17 illustrates an overview flowchart for a process for a mobile device to advertise its presence to access points in accordance with at least one of the various embodiments.

FIG. 17 illustrates an overview flowchart for process 1700 for a mobile device to advertise its presence to access points in accordance with at least one of the various embodiments. At a start block, at block 1702, in at least one of the various embodiments, the mobile device may generate one or more advertising packets that include advertising information for each provisioning key it has been previously provisioned. As described above, each time a mobile device, such as, as a biometric device, is provisioned with an access point, it may store an identifier and provisioning key pair that corresponds to the access point. In some cases, one provisioning key may be associated with more than one physical access point. For example, if a user authorized to access several of the same kind of access points in a building (e.g., secured doors), the mobile device may be arranged to store one provisioning key that is associated with the multiple access points.

In at least one of the various embodiments, the advertising packets that include the advertising information may be generated by a hardware processor, such as, CPU 420 on biometric device 400 or processor 202 on client computer 200. In at least one of the various embodiments, the mobile device may generate a pseudo random advertising nonce, such as, nonce$_{adv}$, that may be used as part of the advertising information. In at least one of the various embodiments, the following three tuple may be generated:

$$(\text{nonce}_{adv}, F_{K_{ID}}(\text{nonce}_{adv}), F_{K_{ID}}(H(F_{K_{ID}}(\text{nonce}_{adv})\|\text{time})))$$

Here, time is the current synchronized time value, $F_{K_{ID}}$ is the access point's provisioning key, F is a cryptographically pseudorandom function, such as AES, and H is a collision resistant hash function, such as SHA-256. As shown above, current synchronized time value may be used to generate the third component of the advertising information. In this example, the time value is bitwise or'd with the output of $F_{K_{ID}}(\text{nonce}_{adv})$ and then this combined value is cryptographically hashed, where upon the hash product is against ran through F. Accordingly, the first component is the unencrypted value of the nonce, the second component is symmetrically encrypted value of the nonce, and the third component is a one-way hash value that incorporates the time value.

In at least one of the various embodiments, in addition to the synchronized time value, other values may be incorporated into the advertising information. For example, in at least one of the various embodiments, a value representing one or more gestures performed by the wearer of the mobile device may be incorporated into the advertising information. Accordingly, in at least one of the various embodiments, advertising information may be generated as follows:

$$(\text{nonce}_{adv}, F_{K_{ID}}(\text{nonce}_{adv}), F_{K_{ID}}(H(F_{K_{ID}}(\text{nonce}_{adv})\|\text{time}\|\gamma)))$$

Where γ represents the additional information, such as, defined value that represent a particular gesture that was recently recognized by the mobile device.

In at least one of the various embodiments, the advertising packets and/or advertising information may be structured such that they may be compatible with one or more network protocols employed by the mobile device. For example, in at least one of the various embodiments, if Bluetooth LE is being used to communicate, the advertising information may be arranged to fit into the payload (e.g., protocol data unit) of a Bluetooth LE advertising packet. Accordingly, in at least one of the various embodiments, the size and representation of the constituent parts of the advertising information tuple included in the advertising packets may be modified to fit the specification of the networking/communication protocols that may be used.

In at least one of the various embodiments, one or more advertising packets may be generated with each advertising packet including advertising information that may be generated for each access point the mobile device has been paired with. In at least one of the various embodiments, the nonce may be the same value for each access point. In other embodiments, the nonce may be generated independently for each access point.

At block 1704, in at least one of the various embodiments, advertising packets may be broadcast on one or more advertising channels. In at least one of the various embodiments, the mobile device may be arranged to use one or more channels for broadcasting the advertising packets that include the advertising information. In at least one of the various embodiments, the various networking/radio protocols supported by the mobile device may define one or more channels and/or frequency ranges set aside for broadcasting advertising packets. In at least one of the various embodiments, in the absence of dedicate channels and/or frequencies, the access points and the mobile device may be configured to employ one or more channels as advertising channels. For example, if Bluetooth LE is employed channels 37, 38, and 39 are designated by the Bluetooth LE standard to be advertising channels. Likewise, if a communication protocol does not support dedicated advertising channels, or if the advertising channels may be too restrictive to broadcast the advertising information, a general purpose channel/frequency that is supported may be employed.

At decision block 1706, in at least one of the various embodiments, if a timer expires indicating that the time value may be incremented, control may flow to block 1708; otherwise, control may loop back to block 1704.

In at least one of the various embodiments, the time value that is used in the advertising information may be represented using value that is incremented after a defined period of time has elapsed. For example, the time value may be a counter that is incremented each minute. In other embodiments, the mobile device may be configured to increment the time value every five minutes. Accordingly, there may be a timer that is tracking the elapsed time to ensure that time value used in the advertising information is incremented.

At block 1708, in at least one of the various embodiments, the time value employed to generate the advertising information may be incremented.

In at least one of the various embodiments, the time value may be computed simply by computing it directly from the synchronized clock value rather than maintain separate timer and/or increment value. For example, if the increment duration is configured to be one minute, the time value used in the advertising information may be computed by disregarding the seconds portion of the clock timer. In other embodiments, other computation may be employed, such as, using modulo math to determine if a set time has elapsed. For example, if the increment duration is 3 minutes, assuming a clock value in seconds, when clock/timer value mod 180=0, 3 minutes have passed—indicating that the advertisement information time value should be incremented.

In at least one of the various embodiments, other timer schemes may be employed. The time value, however it may be computed, may be able to be deterministically computed at the one or more access points. Also, in at least one of the various embodiments, the amount of real time that elapses before an effective change to the advertising information time value may be configurable.

Further, in at least one of the various embodiments, different access points may be configured to require different synchronization precision. Accordingly, in at least one of the various embodiments, the mobile device may increment time values accordingly to a configuration value associated with a particular access point and/or type of access points.

At decision block 1710, in at least one of the various embodiments, if the process is terminated, control may be returned to a calling process; otherwise, control may loop back to block 1702. In at least one of the various embodiments, the advertising process may run until the user deactivates the mobile device, or it otherwise stops operating (e.g., battery failure). In at least one of the various embodiments, if the mobile device is a biometric devices such a biometric device 400, the process may execute until the clasp of the device is opened.

Figure 18:
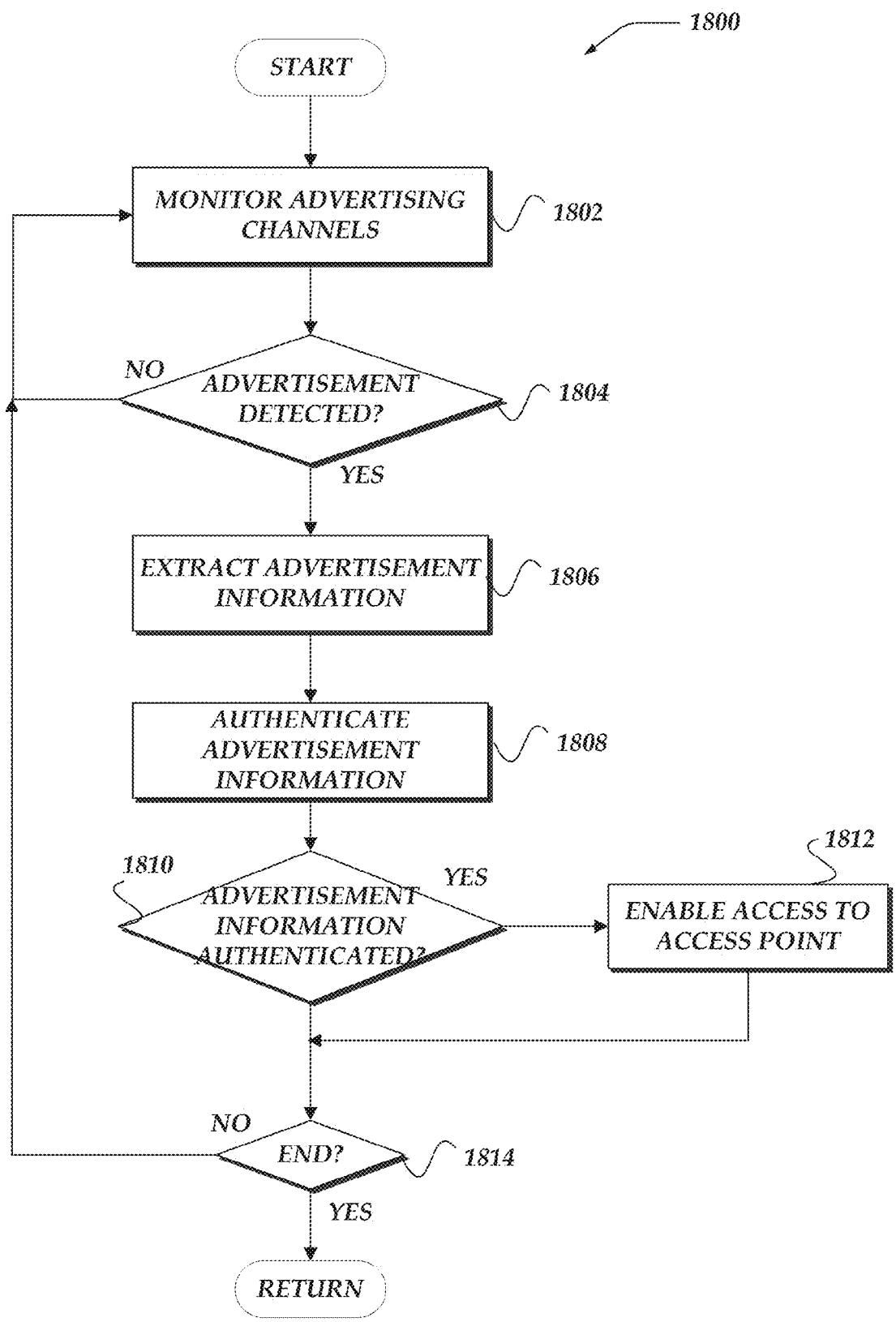
FIG. 18 illustrates an overview flowchart for a process for an access point to determine the presence of an authorized and/or provisioned mobile device in accordance with at least one of the various embodiments.

FIG. 18 illustrates an overview flowchart for process 1800 for an access point to determine the presence of an authorized and/or provisioned mobile device in accordance with at least one of the various embodiments. At a start block, at block 1802, in at least one of the various embodiments, an access point may be arranged to monitor one or more advertising channels. In at least one of the various embodiments, each access point may monitor one or more advertising channel and/or frequencies used for advertising broadcasts. The particular channels and/or frequencies monitored by an access point may depend on the type of transceivers, networking protocols, communication protocols, or the like, that may be employed by the access points and/or the mobile devices that may be provisioned.

Also, in at least one of the various embodiments, an advertising broadcast may be identified based on one or more features of the message/communication. In some embodiments, the features used to identify an advertising broadcast may be built into the underlying communication protocol. In other embodiments, the mobile devices and access points may be arranged to employ custom protocols and/or tags to indicate that a communication is an advertisement broadcast. For example, the Bluetooth LE standard provides a definition for an advertising broadcast message and/or packet. Accordingly, if Bluetooth LE is used for communication, the Bluetooth LE standard for generating and detecting advertisement broadcasts may be employed.

At decision block 1804, in at least one of the various embodiments, if an advertisement broadcast is detected, control may flow to block 1806; otherwise, control may loop back to block 1802. In at least one of the various embodiments, depending on the type of transceivers, networking protocols, communication protocols, or the like, the access point may detect advertising broadcasts from an arbitrary number of devices, including mobile devices that may or may not be provisioned to the access point.

At block 1806, in at least one of the various embodiments, the access point may extract the advertisement packets from the advertisement broadcast. In at least one of the various embodiments, to determine if the advertisement broadcast is associated with a provisioned mobile device, the advertisement packets and the included advertising information may be extracted from one or more communicated message packets associated with the advertisement broadcast.

In at least one of the various embodiments, the actions performed to extract the advertising packets and the advertising information may depend in part on the particular type of transceivers, networking protocols, communication protocols, or the like, used to communicate the advertising broadcast to the access point. For example, if Bluetooth LE was used, the advertisement packets that include the advertisement information may be extracted from the packet data unit of a Bluetooth LE advertisement packet.

At block 1808, in at least one of the various embodiments, the access point may perform actions to validate the advertising packets and/or the advertisement information. In at least one of the various embodiments, the access point may take the unencrypted advertisement nonce, $nonce_{adv}$, and generate an encrypted version of it using its internal provisioning key, $F_{K_{ID}}(nonce_{adv})$. This encrypted version of the nonce may be combined with the advertisement time value, as so, $F_{K_{ID}}(H(F_{K_{ID}}(nonce_{adv})\|time)$. If the computed value of this component matches the corresponding component in the advertising information, the access point may authenticate the mobile device. Note, as described above, in at least one of the various embodiments, each access point/mobile device pairing may result in a unique provisioning key.

Also, in at least one of the various embodiments, if additional information, such as, gestures may be included in the advertisement information, the access point may be arranged to cycle the available gesture values and test the resulting values to see if they match the information provided in the advertisement information. For example, if the access point is arranged to test for a gestures, the value of the last component of the advertisement information extracted from the advertising broadcast may be matched against $F_{K_{ID}}(H(F_{K_{ID}}(nonce_{adv})\|time\|\gamma)$ where $\gamma$ represents the gesture information.

At decision block 1810, in at least one of the various embodiments, if the advertisement information include in the advertising packets is authenticated, control may flow to block 1812; otherwise, control may flow to decision block 1814. In at least one of the various embodiments, the advertisement information may fail to be authenticated for a variety of reasons. In at least one of the various embodiments, if the time since the advertisement information was generated by the mobile device exceeds the allowed duration, such as, one minute, the advertisement time value will not be consistent with the actual time used by the access point. For example, if in an attempt to gain unauthorized access to the access point, a malicious actor replays a previously recorded advertising broadcast. The advertisement information included in the replayed advertisement broadcast will not be authenticated because it the time value inserted by the access point (see, block 1808) will not be the same as the advertisement time value used to generate the advertisement information. Accordingly, the advertisement information will be determined to be stale. Thus, in at least one of the various embodiments, prohibiting the authentication of the mobile device.

As mentioned above, different access points may be configured to require more or less synchronization precision depending on the application and/or type of access point. Also, in at least one of the various embodiments, the value included in the advertising information may be an actual time value, such as, UNIX time (seconds elapsed since Midnight, Jan. 1, 1970). In some embodiments, the time value included in the advertising information may be a counter value that corresponds to a number of time units that have elapsed since the mobile device has been activated and/or time synchronized with the access points.

At block 1812, in at least one of the various embodiments, the access point may enable the user of the mobile device that corresponds to the authenticated advertisement information to access the access point. In at least one of the various embodiments, the actions taken by the access point may depend on the type of access point. For example, if the access point is a door, it may automatically, unlock or open to let a user pass. If the access point is a computer terminal it may login the user associated with the mobile device. Note, the association between the user and mobile devices may be established when the mobile device was provisioned and/or paired with the access point.

In at least one of the various embodiments, the access point may initiate actions that require additional authentication information from the user, such as, entering a PIN, password, pass phrase, or the like, or combination thereof. Further, the access point may require the presentation of additional credentials, and so on, before enabling access to the user.

At decision 1814, in at least one of the various embodiments, if the process is terminated, control may be returned to a calling process; otherwise, control may loop back to block 1802.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. These program instructions may be stored on some type of machine readable storage media, such as processor readable non-transitive storage media, or the like. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems, which perform the specified actions or steps, or combinations of special purpose hardware and computer instructions. The foregoing example should not be construed as limiting and/or exhaustive, but rather, an illustrative use case to show an implementation of at least one of the various embodiments of the invention.

What is claimed as new and desired to be protected by Letters Patent of the United States is:

1. A method for employing a device to communicate data over a network, wherein the device performs actions, comprising:

employing an authentication of a user of the device, by an authorized authentication device (AAD), to perform further actions, including:
providing one or more unique information packets based on one or more provisioning keys; and
communicating the one or more information packets to one or more remote access points, wherein the one or more remote access points employ the one or more provisioning keys to provide one or more local versions of the one or more information packets; and
employing a match of one or more comparisons performed by the one or more remote access points between its one or more local versions of the information packets to the communicated one or more information packets to provide the user with access to one or more remote access points having the one or more matching comparisons.

2. The method of claim 1, wherein the authentication is based on biometric signals of the user.

3. The method of claim 1, wherein the one or more provisioning keys are locally stored on the device and locally stored on the one or more remote access points.

4. The method of claim 1, wherein the providing of the one or more information packets further comprises a synchronized time value.

5. The method of claim 1, wherein the one or more information packets correspond to one or more of the one or more provisioning keys.

6. The method of claim 1, wherein providing the one or more information packets, further comprises:
providing a nonce based on a pseudorandom number generator;
encrypting the nonce based on the one or more provisioning keys; and
providing an encrypted hash value, wherein the encrypted hash value includes the encrypted nonce and a synchronized time value.

7. The method of claim 1, wherein the one or more information packets further comprise, one or more additional values, including at least one of a gesture value, a personal identification number, a password, a touch pattern, or a pass phrase.

8. The method of claim 1, further comprising, when the user disengages the device, unsetting a synchronized time value and encrypting a cryptographic state of the device.

9. A device for authenticating a user, comprising:
a transceiver that communicates over a network;
a memory that stores at least instructions; and
a processor device that executes instructions that enable actions, including:
employing an authentication of the user of the device, by an authorized authentication device (AAD), to perform further actions, including:
providing one or more unique information packets based on one or more provisioning keys; and
communicating the one or more information packets to one or more remote access points, wherein the one or more remote access points employ the one or more provisioning keys to provide one or more local versions of the one or more information packets; and
employing a match of one or more comparisons performed by the one or more remote access points between its one or more local versions of the information packets to the communicated one or more information packets to provide the user with access to one or more remote access points having the one or more matching comparisons.

10. The device of claim 9, wherein the authentication is based on biometric signals of the user.

11. The device of claim 9, wherein the one or more provisioning keys are locally stored on the mobile device and locally stored on the one or more remote access points.

12. The device of claim 9, wherein the providing of the one or more information packets further comprises a synchronized time value.

13. The device of claim 9, wherein the one or more information packets corresponds to one or more of the one or more provisioning keys.

14. The device of claim 9, wherein providing the one or more information packets, further comprises:
providing an nonce based on a pseudorandom number generator;
encrypting the nonce based on the one or more provisioning keys; and
providing an encrypted hash value, wherein the encrypted hash value includes the encrypted nonce and a synchronized time value.

15. The device of claim 9, wherein the one or more information packets further comprise, one or more additional values, including at least one of a gesture value, a personal identification number, a password, a touch pattern, or a pass phrase.

16. The device of claim 9, further comprising, when the user disengages the device, unsetting a synchronized time value and encrypting a cryptographic state of the device.

17. A system for employing a device to communicate data, comprising:
an authorized authentication device (AAD), comprising:
a transceiver that communicates over a network;
a memory that stores at least instructions; and
one or more processors that execute instructions that perform actions, including authenticating a user of the device; and
the device comprising:
a transceiver that communicates over a network;
a memory that stores at least instructions; and
one or more processor devices that execute instructions that perform actions, including:
providing one or more unique information packets based on one or more provisioning keys; and
communicating the one or more information packets to one or more remote access points, wherein the one or more remote access points employ the one or more provisioning keys to provide one or more local versions of the one or more information packets; and
employing a match of one or more comparisons performed by the one or more remote access points between its one or more local versions of the information packets to the communicated one or more information packets to provide the user with access to one or more remote access points having the one or more matching comparisons.

18. The system of claim 17, wherein the authentication is based on biometric signals of the user.

19. The system of claim 17, wherein the one or more provisioning keys are locally stored on the device and locally stored on the one or more remote access points.

20. The system of claim 17, wherein the providing of the one or more information packets further comprises a synchronized time value.

* * * * *